(12) United States Patent
Toida et al.

(10) Patent No.: US 12,134,545 B2
(45) Date of Patent: Nov. 5, 2024

(54) CRANE INSPECTION SYSTEM AND CRANE

(71) Applicant: SUMITOMO HEAVY INDUSTRIES CONSTRUCTION CRANES CO., LTD., Tokyo (JP)

(72) Inventors: Minoru Toida, Tokyo (JP); Kohei Honjo, Aichi (JP); Katuaki Kamashima, Tokyo (JP)

(73) Assignee: Sumitomo Heavy Industries Construction Cranes Co., Ltd., Tokyo (JP)

( * ) Notice: Subject to any disclaimer, the term of this patent is extended or adjusted under 35 U.S.C. 154(b) by 286 days.

(21) Appl. No.: 17/511,113

(22) Filed: Oct. 26, 2021

(65) Prior Publication Data

US 2022/0041411 A1 Feb. 10, 2022

Related U.S. Application Data

(63) Continuation of application No. PCT/JP2020/017523, filed on Apr. 23, 2020.

(30) Foreign Application Priority Data

Apr. 26, 2019 (JP) .................. 2019-086274

(51) Int. Cl.
*B66C 13/16* (2006.01)
*B64C 39/02* (2023.01)
(Continued)

(52) U.S. Cl.
CPC ............ *B66C 13/16* (2013.01); *B64C 39/024* (2013.01); *B66C 13/46* (2013.01); *B66C 23/42* (2013.01);
(Continued)

(58) Field of Classification Search
CPC ......... B66C 13/16; B66C 13/46; B66C 23/42; B66C 13/12; B66C 15/00; B64C 39/024;
(Continued)

(56) References Cited

U.S. PATENT DOCUMENTS 8,251,307 B2    8/2012   Goossen
11,053,105 B2 * 7/2021   Sembo ..................... H04N 7/18
(Continued)

FOREIGN PATENT DOCUMENTS

CN    107380420 A    11/2017
CN    108802040 A    11/2018
(Continued)

OTHER PUBLICATIONS

Search Report issued in European Application No. 20 79 4131.1, dated Jun. 15, 2022.
(Continued)

*Primary Examiner* — Luong T Nguyen
(74) *Attorney, Agent, or Firm* — Michael Best & Friedrich LLP

(57) ABSTRACT

There is provided a crane inspection system including a mobile unit including an imaging unit and moving around a crane, and a processing unit that performs predetermined processing on captured image data captured by the imaging unit. The mobile unit images a plurality of locations including an inspection location of the crane.

11 Claims, 13 Drawing Sheets

(51) Int. Cl.
*B64U 10/13* (2023.01)
*B64U 101/30* (2023.01)
*B66C 13/46* (2006.01)
*B66C 23/42* (2006.01)
*G06T 7/00* (2017.01)
*G06T 17/00* (2006.01)

(52) U.S. Cl.
CPC ............ *G06T 7/0004* (2013.01); *G06T 17/00* (2013.01); *B64U 10/13* (2023.01); *B64U 2101/30* (2023.01); *G06T 2200/08* (2013.01); *G06T 2207/10032* (2013.01)

(58) Field of Classification Search
CPC ... G06T 7/0004; G06T 17/00; G06T 2200/08; G06T 2207/10032; B64U 10/13; B64U 2101/30; B64U 10/14; B64U 50/19; B64U 50/34; G05D 2201/0202; G05D 1/0094
See application file for complete search history.

(56) References Cited

U.S. PATENT DOCUMENTS

| | | | |
|---|---|---|---|
| 11,679,961 B2* | 6/2023 | Palberg | B64C 39/024 |
| | | | 701/3 |
| 2004/0057718 A1* | 3/2004 | Chapman | F16M 11/2064 |
| | | | 396/428 |
| 2005/0232733 A1* | 10/2005 | Maurer | B66C 13/085 |
| | | | 414/334 |
| 2016/0034730 A1* | 2/2016 | Delplace | G06K 7/10366 |
| | | | 340/8.1 |
| 2019/0016569 A1 | 1/2019 | Palberg et al. | |
| 2019/0130641 A1* | 5/2019 | Barajas Hernandez | |
| | | | G06F 18/22 |
| 2020/0019167 A1* | 1/2020 | Alshamrani | G05D 1/101 |

FOREIGN PATENT DOCUMENTS

| | | |
|---|---|---|
| EP | 2 003 057 A2 | 12/2008 |
| EP | 3 680 648 A1 | 7/2020 |
| JP | S62-176346 U | 11/1987 |
| JP | H03-177298 A | 8/1991 |
| JP | H08-053290 A | 2/1996 |
| JP | 2011-207571 A | 10/2011 |
| JP | 2017-171418 A | 9/2017 |
| JP | 2017-226259 A | 12/2017 |
| JP | 2018-074757 A | 5/2018 |
| JP | 2018-096762 A | 6/2018 |
| JP | 2018-162125 A | 10/2018 |
| JP | 2018-188250 A | 11/2018 |
| JP | 2019-009919 A | 1/2019 |
| WO | WO-2017/174203 A1 | 10/2017 |
| WO | 2019/047338 A1 | 3/2019 |

OTHER PUBLICATIONS

International Search Report issued in Application No. PCT/JP2020/017523, mailed Jul. 7, 2020.

* cited by examiner

FIG. 7

| DATA AND TIME INFORMATION | WORK MACHINE ID | DIAGNOSIS RESULT |
|---|---|---|
| MM/DD/YYYY hh:mm:ss | AAAAAA | NORMAL |
| MM/DD/YYYY hh:mm:ss | XXXXXX | NORMAL |
| MM/DD/YYYY hh:mm:ss | BBBBBB | NORMAL |
| MM/DD/YYYY hh:mm:ss | XXXXXX | NORMAL |
| MM/DD/YYYY hh:mm:ss | AAAAAA | NORMAL |
| MM/DD/YYYY hh:mm:ss | XXXXXX | NORMAL |
| ⋮ | ⋮ | ⋮ |

FIG. 8

| WORK MACHINE ID | CUSTOMER INFORMATION | DELIVERY DESTINATION ADDRESS (REGISTERED INFORMATION) |
|---|---|---|
| AAAAAA | ⋯ | XXX@example.co.jp |
| BBBBBB | ⋯ | YYY@example.co.jp |
| ⋮ | ⋮ | ⋮ |

CRANE INSPECTION SYSTEM AND CRANE

RELATED APPLICATIONS

The contents of Japanese Patent Application No. 2019-086274, and of International Patent Application No. PCT/JP2020/017523, on the basis of each of which priority benefits are claimed in an accompanying application data sheet, are in their entirety incorporated herein by reference.

BACKGROUND

Technical Field

Certain embodiments of the present invention relate to a crane inspection system and a crane.

Description of Related Art

A work machine such as a crane requires various inspections for work safety.

In particular, as the size of the device increases, such as a tower crane, the demand for safety increases (for example, refer to the related art).

SUMMARY

According to an embodiment of the present invention, there is provided a crane inspection system including a mobile unit including an imaging unit and moving around a crane, and a processing unit that performs predetermined processing on captured image data captured by the imaging unit. The mobile unit images a plurality of locations including an inspection location of the crane.

BRIEF DESCRIPTION OF THE DRAWINGS

FIG. 7 is a view illustrating an example of information stored in an inspection information database of the crane.

FIG. 8 is a view illustrating an example of information stored in a customer information database.

DETAILED DESCRIPTION

In a state where a boom performs derricking, high-place work is required. Accordingly, inspection work for a crane is carried out in a state where the boom is lowered. However, there is a problem in that a wide work space is required to lower the boom.

In addition, due to the problem, the inspection work for the crane may be less likely to be carried out on a jobsite in some cases.

It is desirable to facilitate inspection of a crane.

According to an embodiment of the present invention, it is possible to easily inspect a crane.

Schematic Configuration of Crane Inspection System

Figure 1:
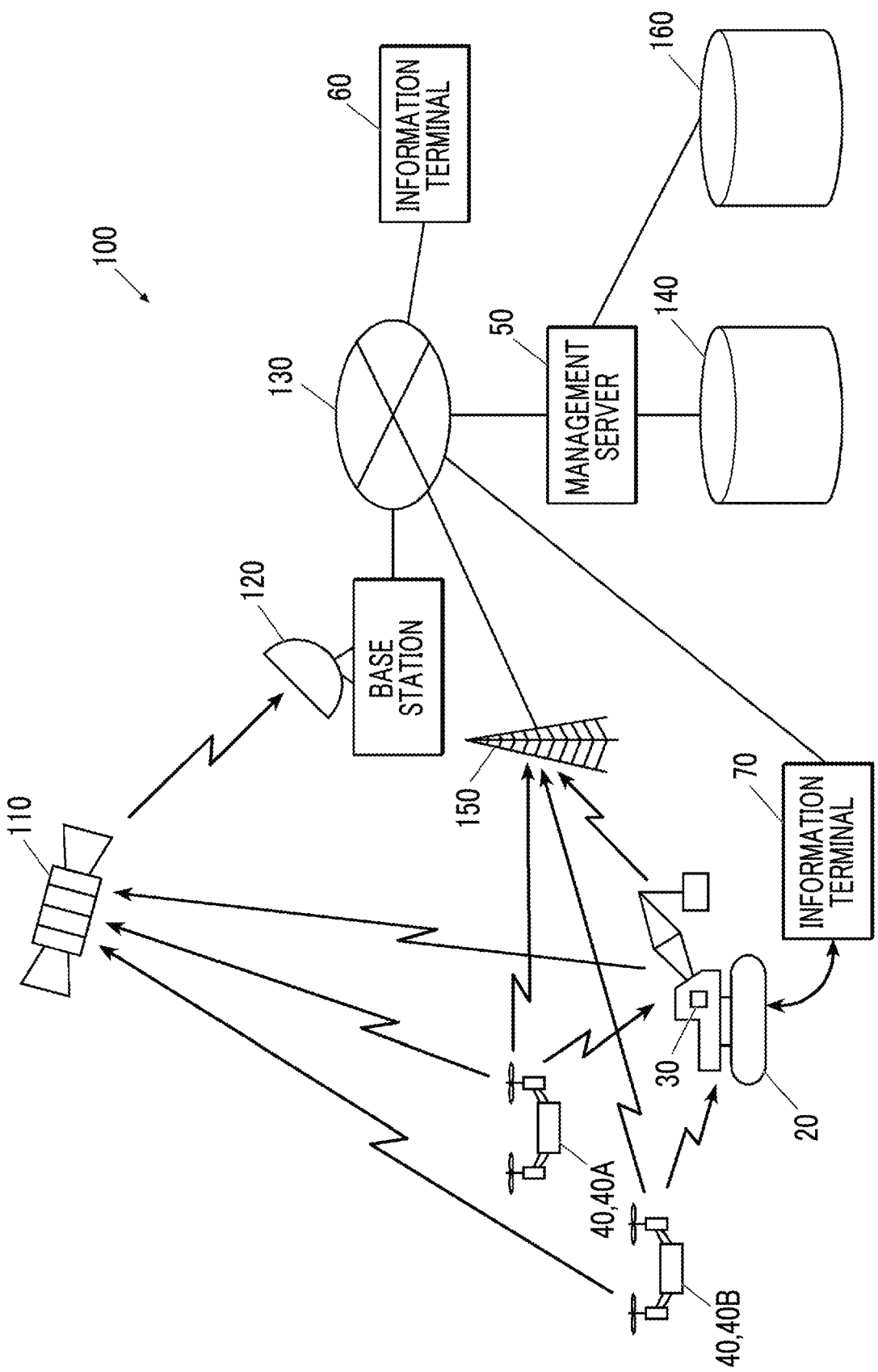
FIG. 1 is a view for describing a schematic configuration of a crane inspection system according to an embodiment of the present invention.

FIG. 1 is a view for describing a schematic configuration of a crane inspection system according to an embodiment of the present invention. As illustrated in FIG. 1, an inspection system 100 includes a first mobile unit 40A and a second mobile unit 40B which move around a crane 20, and a crane terminal 30, information terminals 60 and 70, and a management server 50 which serve as processing units for performing predetermined processing on data of information acquired by each of the first mobile unit 40A and the second mobile unit 40B.

The management server 50 is connected to a network 130, serving as a general public line network.

In addition to the management server 50, base stations 120 and 150 and the information terminals 60 and 70 are connected to the network 130. The management server 50 can exchange data with nodes connected to the network 130, that is, the base stations 120 and 150, each of the mobile units 40A and 40B, and the plurality of terminals 30, 60, and 70.

The base station 120 is a base station of a satellite communication line which can transmit and receive radio waves via a satellite 110, and the base station 150 is a base station of a so-called mobile phone communication line.

When the base stations 120 and 150 receive various data from the mobile unit bodies 40A and 40B or the crane terminal 30, the base stations 120 and 150 transmit the data to the management server 50 via the network 130.

The crane 20 includes various sensor for detecting a state of each part of the crane 20 itself, and the crane terminal 30 that can communicate with the network 130.

A controller 31 (refer to FIG. 5) included in the crane terminal 30 causes a first transmitting unit 351 and a second transmitting unit 352 (refer to FIG. 5) to transmit information detected by various sensors (hereinafter referred to as sensor information) to the base stations 120 and 150. In addition, the crane terminal 30 can cause the first receiving unit 361 and the second receiving unit 362 (refer to FIG. 5) to receive predetermined information.

An inspection information database 140 and a customer information database 160 are connected to the management server 50. A control device 51 (refer to FIG. 6) included in the management server 50 causes the inspection information database 140 to store diagnostic information data received from the first mobile unit 40A, the second mobile unit 40B, and the crane terminal 30 via the base stations 120 and 150 and state information data generated from the diagnostic information data.

The control device 51 included in the management server 50 transmits the state information data stored in the inspection information database 140 to the predetermined information terminal 60 and 70 and the crane terminal 30 via the network 130. The control device 51 included in the management server 50 determines a transmission destination of the information, based on contents of the customer information database 160. For example, the information is transmitted to the information terminal 70 used by a site supervisor who is a user of the crane 20, or the information terminal 60 used by an administrator who is a business-involved user using the crane 20 at a place away from a jobsite, and is displayed on display screens of the information terminals 60 and 70.

Although FIG. 1 illustrates only one for the crane 20 and the information terminals 60 and 70, the management server 50 is actually configured to transmit and receive the information between a large number of the cranes 20 and a large number of the information terminals 60 and 70.

Mobile Unit

Here, the first mobile unit 40A and the second mobile unit 40B will be described with reference to the drawings.

Figure 2:
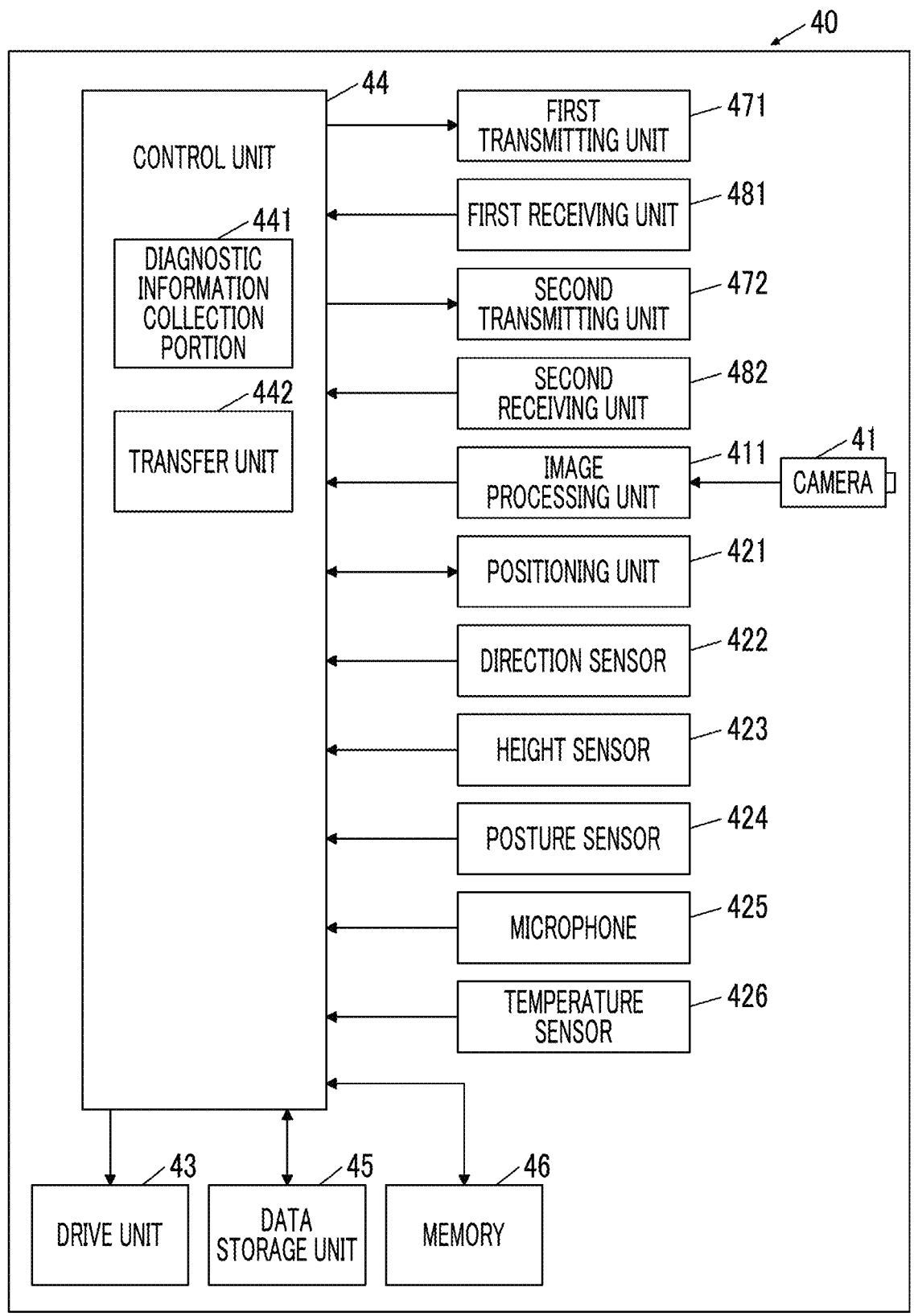
FIG. 2 is a block diagram illustrating a control system of a mobile unit.

FIG. 2 is a block diagram illustrating a control system of the mobile unit 40. The first mobile unit 40A and the second mobile unit 40B have common configurations. Accordingly, when the common configurations are described, both of these will simply be defined as the "mobile unit 40". When both of these need to be separately described, both of these will be defined as the "first mobile unit 40A" and the "second mobile unit 40B".

The mobile unit 40 is a machine body which is a so-called drone which has a plurality of rotors, can fly by controlling an output of a motor serving as a drive source of each rotor, and can freely perform raising/lowering operations, forward/rearward/rightward/leftward movements, and positive/negative turning.

The mobile unit 40 moves around the crane 20 which is an inspection target, images each part thereof, and transmits acquired captured image data to the crane terminal 30 and the management server 50 which serve as the processing units.

As illustrated in FIG. 2, the mobile unit 40 includes a camera 41 serving as an imaging unit, a positioning unit 421, a direction sensor 422, a height sensor 423, a posture sensor 424, a microphone 425 serving as a sensor, a temperature sensor 426, a drive unit 43, a control unit 44, a data storage unit 45, a memory 46, first and second transmitting units 471 and 472, and first and second receiving units 481 and 482.

The sensors such as the positioning unit 421, the direction sensor 422, the height sensor 423, the posture sensor 424, the microphone 425 serving as the sensor, the temperature sensor 426 which are described above are examples. A configuration may be adopted in which the sensors are not partially or entirely mounted on the mobile unit 40.

The camera 41 is supported to be directed in a predetermined direction from the machine body of the mobile unit 40, and images a scene ahead of the line of sight in accordance with a direction of the machine body. The camera 41 can continuously acquire captured images at a constant frame rate. In this manner, it is possible to image a plurality of locations including an inspection location. An image signal obtained by imaging is output to an image processing unit 411 connected to the camera 41. Captured image data having a predetermined format is generated by the image processing unit 411, and is stored in the memory 46.

The camera 41 is not limited to those which acquire an image of visible light, and an infrared camera for imaging infrared rays may be used. When the infrared camera is used, distance image data can be obtained by using a phase difference method.

Moreover, not only a monocular camera but also a stereo camera may be used. In this case, it is also possible to obtain the distance image data.

The positioning unit 421 is a global navigation satellite system (GNSS) receiver of a global positioning system (GPS), and measures a current position of the mobile unit 40.

The direction sensor 422 is a three-axis gyro azimuth sensor, and detects an advancing direction of the mobile unit 40 and a tilt angle of the machine body.

For example, the height sensor 423 is an optical type, and projects light downward to detect a height of the machine body from a phase difference generated by reflected light thereof.

The posture sensor 424 includes a three-dimensional acceleration sensor, and detects acceleration in each direction of an X-axis, a Y-axis, and a Z-axis which are defined in the mobile unit 40. A posture of the machine body can be detected from gravitational acceleration detected for each of these axes.

The microphone 425 has directivity, and detects sound of an object located ahead in a direction the same as that of the line of sight of the camera 41.

The temperature sensor 426 is a so-called radiation thermometer having a non-contact type, and detects a temperature of the object located ahead in the direction the same as that of the line of sight of the camera 41.

The first transmitting unit 471 and the first receiving unit 481 communicate with the base station 120 via the satellite 110.

In addition, the second transmitting unit 472 and the second receiving unit 482 directly communicate with the base station 150.

The drive unit 43 is configured to output a thrust for a movement operation of the mobile unit 40, and has a plurality of rotors and a plurality of motors serving as rotation drive sources provided for each rotor. Each motor is controlled by the control unit 44 so that the machine body moves in a target movement direction.

The data storage unit 45 is a non-volatile storage device that stores various information relating to a control program and control of the mobile unit 40.

The memory 46 stores captured image data captured by the camera 41 and detection data detected by the microphone 425 and the temperature sensor 426.

The memory 46 may be configured to include a non-volatile storage device. In addition, the memory 46 may be configured to include a removable recording medium. In this case, the removed recording medium can be used to transfer the captured image data and the detection data to the external crane terminal 30, the information terminals 60 and 70, and the management server 50 without passing through the network 130.

The control unit 44 includes a diagnostic information collection portion 441 and a transfer unit 442. These are functional configurations realized in such a manner that a central processing unit included in the control unit 44 executes a program in the data storage unit 45.

The diagnostic information collection portion 441 executes operation control for moving the machine body to an imageable area including an imaging position at a predetermined inspection location for the crane 20.

Furthermore, the diagnostic information collection portion 441 executes operation control for acquiring the captured image data and the detection data by causing the camera 41 to capture an image and causing the microphone 425 and the temperature sensor 426 to detect the data for the inspection location or a predetermined range including the inspection location.

With regard to the inspection locations of the crane 20, for example, position coordinates of the inspection location in a coordinate system defined for the crane 20 are prepared in advance in the data storage unit 45.

Then, the mobile unit 40 is disposed at a predetermined reference position in a predetermined direction for the crane 20. In this manner, the position coordinates of the inspection location in the coordinate system of the current position acquired by the positioning unit 421 can be calculated.

In this manner, the diagnostic information collection portion 441 can control the drive unit 43 to move the mobile unit 40 to the imageable area of the inspection location of the crane 20.

In addition, the inspection location of the crane 20 may move due to pivoting of a tower boom 24 or a tower jib 25. In this case, the diagnostic information collection portion 441 acquires pivoting angle information of the tower boom 24 or the tower jib 25 from the crane terminal 30 by performing communication via the first or second receiving units 481 and 482, and corrects the position coordinates of the inspection location. Then, the mobile unit 40 is moved to the imageable area including the imaging position of the corrected inspection location.

In addition, a marking serving as an index may be attached to a predetermined location of the crane 20, and the diagnostic information collection portion 441 may detect the marking from the captured image of the crane 20 by performing pattern matching. Based on a detection position of the marking, the mobile unit 40 may be moved to the imageable area of the inspection location of the crane 20.

In addition, a transmitter such as a beacon is provided at the predetermined location of the crane 20, and a receiver for the transmitter is provided in the mobile unit 40. Then, the diagnostic information collection portion 441 may specify a transmitting position of the transmitter, and based on the transmitting position, the mobile unit 40 may be moved to the imageable area including the imaging position of the inspection location of the crane 20.

The transfer unit 442 performs processing for causing the memory 46 to record the captured image data and the detection data which are acquired by imaging of the camera 41 and sensing of the microphone 425 and the temperature sensor 426 in the imageable area.

In addition, the transfer unit 442 causes the memory 46 to record information on imaging and detection positions and postures of the mobile unit 40 which are acquired from the direction sensor 422 and the posture sensor 424 in association with the captured image data and the detection data (hereinafter, the captured image data and the detection data which are associated with the information on imaging and detection positions and postures of the mobile unit 40 which are acquired from the direction sensor 422 and the posture sensor 424 will be referred to as "diagnostic information data").

In addition, the transfer unit 442 causes the first and second transmitting units 471 and 472 to transmit the same diagnostic information data as the diagnostic information data recorded in the memory 46 to the crane terminal 30 and the management server 50 which serve as the processing units.

The first mobile unit 40A and the second mobile unit 40B have different inspection locations of the crane 20 which are prepared in advance in the data storage unit 45. The first mobile unit 40A performs imaging and sensing in an imageable area (first region) of one inspection location), and the second mobile unit 40B performs imaging and sensing in an imageable area (second region) of the other inspection location. The regions may partially overlap each other. In addition, the inspection locations in charge of each of the mobile units 40A and 40B may be a plurality of the inspection locations which do not overlap each other, or may partially overlap each other.

In addition, without being limited to the inspection location, the camera 41 of each mobile unit 40 may image a wide range including the inspection location or a part of the crane 20 other than the inspection location.

The number of the machine bodies of the mobile unit 40 is not limited to two, and may be one, three, or more. When the number of the machine bodies is three or more, it is preferable that all of the inspection locations of the crane 20 which are prepared in advance in the data storage unit 45 are different from each other.

In addition, the first mobile unit 40A may be configured to perform imaging on the inspection location, and the second mobile unit 40B may be configured to perform sensing by the microphone 425 or the temperature sensor 426.

A case where the diagnostic information collection portion 441 controls the mobile unit 40 to autonomously move the machine body to the imageable area of the inspection location of the crane 20 has been described as an example. However, a configuration may be adopted in which the mobile unit 40 can be operated by an external radio control device so that a worker who is a user operates the radio control device. In this manner, a configuration may be adopted in which the mobile unit 40 is moved to the imageable area of the inspection location of the crane 20 to perform imaging and sensing.

Figure 3:
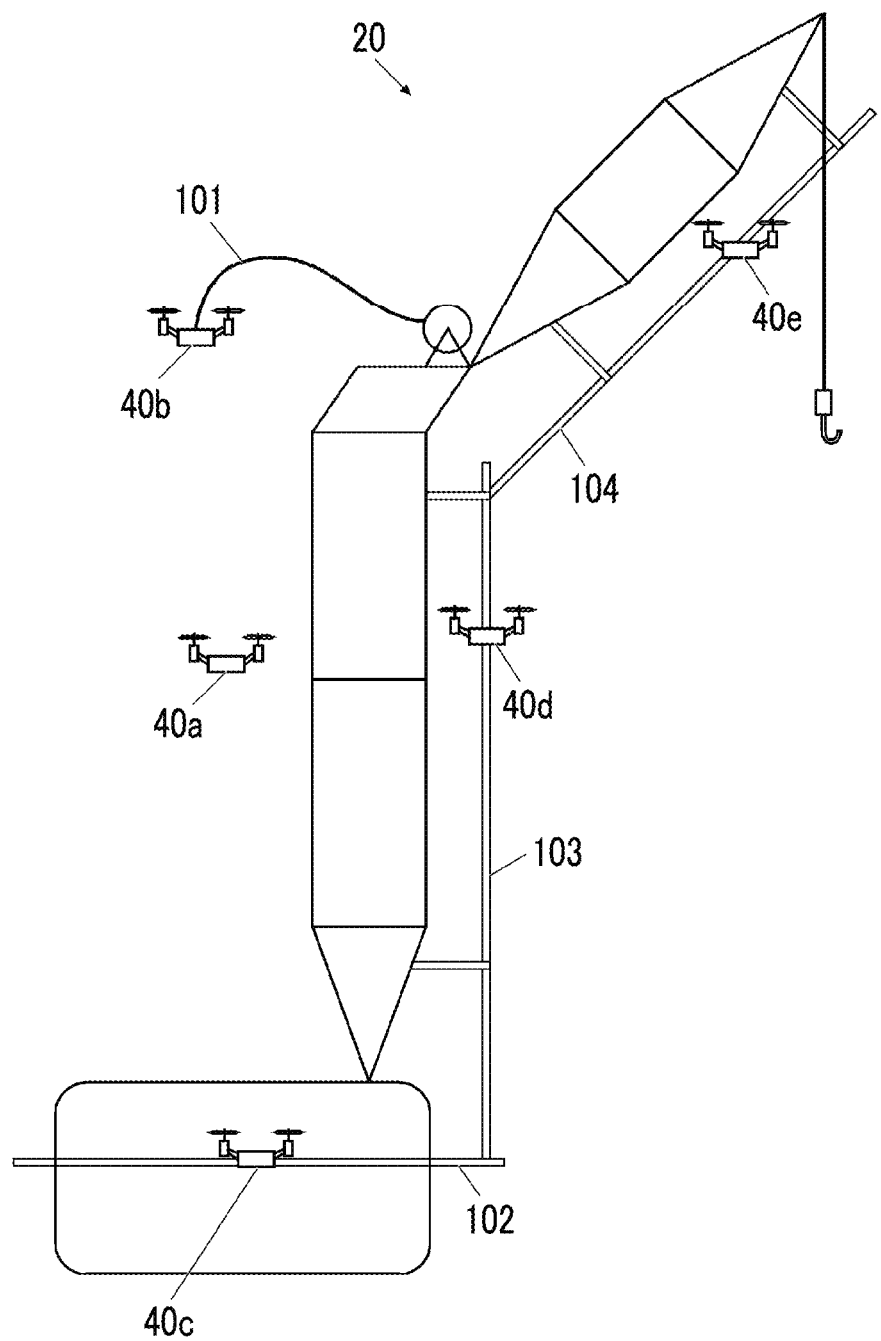
FIG. 3 is a view for describing a disposition example of the mobile unit with respect to a crane.

FIG. 3 is a view for describing a disposition example of the first mobile unit 40A and the second mobile unit 40B with respect to the crane 20. FIG. 3 schematically illustrates the crane 20. In addition, mobile units 40a to 40e in the drawing and mobile units 40f and 40g (to be described later) have the same configuration as the above-described mobile unit 40.

As in the mobile unit 40a, the first mobile unit 40A and the second mobile unit 40B may be disposed to be movable by flying around the crane 20 in a state where there is no physical restraint.

In addition, as in the mobile unit 40b, the first mobile unit 40A and the second mobile unit 40B may be in a state of being connected to the crane 20 by a cable 101 reinforced with a wire. The cable 101 enables power supply from the crane 20 to the mobile unit 40b and data communication between the mobile unit 40b and the crane terminal 30.

In addition, the cable 101 can be wound and unwound, and a reachable range of the cable 101 is set as a movable range of the mobile unit 40b.

In addition, as in the mobile units 40c to 40e, a configuration may be adopted in which the first mobile unit 40A and the second mobile unit 40B are supported to be slidable along rail-shaped guide members 102 to 104 supported by the crane 20.

The guide members 102 to 104 are provided with sliders (not illustrated) that can slide along the guide members 102 to 104, and a support member (not illustrated) that support each of the mobile units 40c to 40e extends from the slider. The support member supports each of the mobile units 40c to 40e with a degree of freedom so that the posture of each of the mobile units 40c to 40e can be changed within a certain range.

In addition, it is preferable to take measures as follows. A turning stopper is provided so that each of the mobile units 40c to 40e does not turn around each of the guide members 102 to 104. Each of the guide members 102 to 104 does not have a circular cross section. Each of the guide members 102 to 104 is configured to include each of the plurality of rails.

In addition, in a case of a configuration in which each of the mobile units 40c to 40e is supported to be movable along each of the guide members 102 to 104, each of the mobile units 40c to 40e may have a structure which cannot fly, and can travel along each of the guide members 102 to 104. That is, the mobile units 40c to 40e may be configured to be movable around the crane, and a movement form thereof is not particularly limited.

As described above, when each of the guide members 102 to 104 supports each of the mobile units 40c to 40e, the guide member may be disposed inside the tower boom 24 of the crane 20. In this manner, the mobile unit 40 can perform satisfactory imaging and sensing on the inspection location inside the narrow tower boom 24 in which flying is extremely difficult.

A detailed example of the mobile unit supported by each of the guide members 102 to 104 will be described later.

Crane

The crane 20 will be described with reference to FIG. 4. Here, as the crane 20, a so-called mobile type tower crane will be described as an example. In describing the crane 20 below, a forward moving direction of the crane 20 (regardless of a facing direction of a rotating platform 22, a predetermined forward moving direction of a lower traveling body 21) will be defined as "front". A rearward moving direction will be defined as "rear". A left hand side in a state of facing the front will be defined as "left". A right hand side in a state of facing the front will be defined as "right".

As illustrated in the drawing, the crane 20 is configured to include the lower traveling body 21 having a crawler type that can travel by itself, the rotating platform. 22 mounted on the lower traveling body 21 to be capable of turning, and a front attachment 23 attached to a front side of the rotating platform 22 to be capable of derricking.

The rotating platform 22 configures a crane body of the crane 20, and has a turning frame 221 extending in forward and rearward directions. A boom attachment portion 222 is provided on a front side of the turning frame 221, and a base end 249 of the tower boom 24 (to be described later) is attached to the boom attachment portion 222 to be capable of derricking.

In addition, in the turning frame 221, a mast attachment portion 223 is provided in the vicinity of a rear side of the boom attachment portion 222. A base end of the mast 224 (to be described later) is attached to the mast attachment portion 223 to be pivotable. Furthermore, in the turning frame 221, a base end of a backstop 225 (to be described later) is attached to a rear side of the mast attachment portion 223 to be pivotable.

A counterweight 226 for balancing a weight between the front attachment 23 and a suspended load is arranged on the rear side of the turning frame 221. In addition, a boom derricking winch (not illustrated) is arranged on the rear side of the turning frame 221. On the other hand, a cab 227 in which a driver's seat and various manipulation devices (all are not illustrated) are disposed is provided on front right side of the turning frame 221.

The front attachment 23 is provided in the rotating platform 22, and transports luggage such as materials between the ground and a high place. The front attachment 23 is configured to include the tower boom 24, the tower jib 25, and a tower strut 26.

The tower boom 24 is attached to the rotating platform 22 to be capable of derricking. The tower boom 24 is configured to include a lower boom 241 whose base end (foot portion) 249 is attached to the boom attachment portion 222 of the turning frame 221 to be capable of derricking, a plurality of (for example, three stages) intermediate booms 242 whose base end is attached to a tip of the lower boom 241, and an upper boom 243 attached to a tip of the intermediate boom 242 located on a most tip side. A jib derricking winch 244 and a main winding winch 245 (to be described later) are attached to the lower boom 241.

As illustrated in the drawing, each pillar member of the intermediate booms 242 adjacent to each other in a length direction is connected by using a connecting pin. In addition, the intermediate boom 242 located on a lowermost side and the lower boom 241, and the intermediate boom 242 located on an uppermost side and the upper boom 243 are respectively connected to each other by using the connecting pins.

Figure 4:
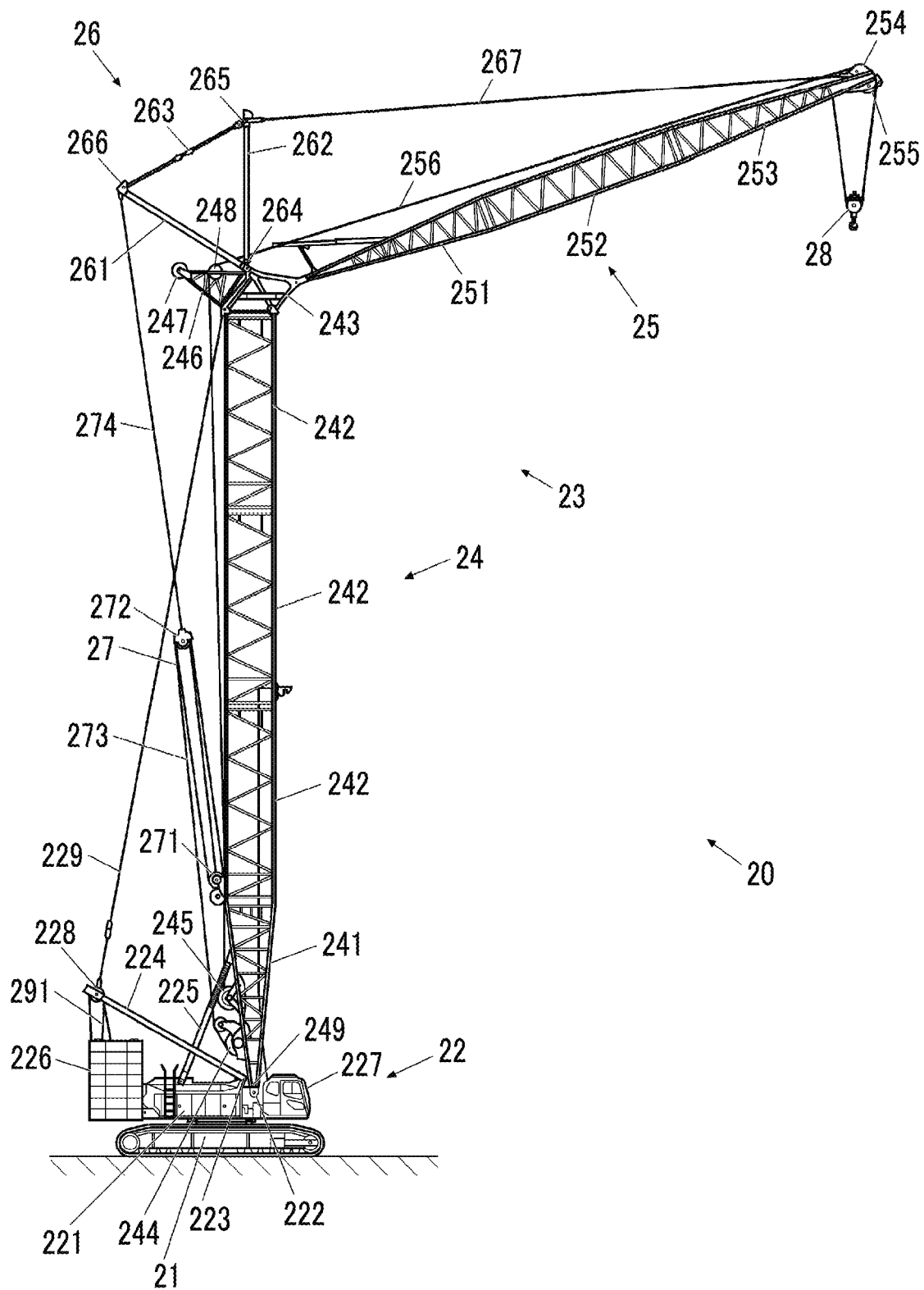
FIG. 4 is a side surface view of the crane.

The upper boom 243 has a shape whose upper portion protrudes forward when the tower boom 24 is in a standing posture (posture illustrated in FIG. 4). A lower side portion of the upper boom 243 is attached to a tip (upper end) of the intermediate boom 242 located on the uppermost side. The tower jib 25 (to be described later) is attached to a front end side of the upper boom 243 to be capable of derricking, and the tower strut 26 (to be described later) is attached to an upper end side of the upper boom 243 to be capable of oscillating. In addition, a triangular sheave bracket 246 projects rearward in the upper boom 243. A tower guide sheave 247 and a guide sheave 248 are attached to the sheave bracket 246 to be rotatable.

The tower jib 25 is attached to the tip of the upper boom 243 of the tower boom 24 to be capable of derricking. The tower jib 25 is configured to include a lower jib 251 whose base end is attached to upper boom 243 to be capable of derricking, an intermediate jib 252 attached to a tip of the lower jib 251, and an upper jib 253 provided in a tip of the intermediate jib 252. A guide sheave 254 and a point sheave 255 are attached to a tip side of the upper jib 253 to be rotatable. A main winding rope 256 (to be described later) is wound around the guide sheave 254 and the point sheave 255.

The tower strut 26 is attached to an upper end side of the upper boom 243 of the tower boom 24 to be capable of oscillating. The tower strut 26 connects a first strut 261, a second strut 262, and a third strut 263 by using a first connecting portion 264, a second connecting portion 265, and a third connecting portion 266. In this manner, the tower strut 26 is configured as a triangular structure.

Here, the first connecting portion 264 of the tower strut 26 is attached to the upper end side of the upper boom 243. In this manner, the tower strut 26 is attached to an upper end of the tower boom 24 to be capable of oscillating while the first connecting portion 264 serves as a fulcrum. In addition, one end of a pendant rope 267 is connected to the second connecting portion 265, and the other end of the pendant rope 267 is connected to the tip side of the upper jib 253 of the tower jib 25. Furthermore, a boom-side pendant rope 274 (to be described later) is connected to the third connecting portion 266.

The jib derricking winch 244 is attached to the lower boom 241 of the tower boom 24. The jib derricking winch 244 causes the tower jib 25 to perform derricking via the tower strut 26. The jib derricking winch 244 and the third connecting portion 266 of the tower strut 26 are connected to each other by a jib derricking rope 27.

The jib derricking rope 27 is provided between the jib derricking winch 244 and the tower strut 26. The jib derricking rope 27 is configured to include a lower spreader 271 having a plurality of sheaves attached to the intermediate boom 242 of the tower boom 24, an upper spreader 272 having a plurality of sheaves provided to face the lower spreader 271, a winding rope 273 wound around the jib derricking winch 244 in a state of being sequentially wound around the sheave of the lower spreader 271 and the sheave of the upper spreader 272, and a boom-side pendant rope 274 in which one end is connected to the upper spreader 272 and the other end is connected to the third connecting portion 266 of the tower strut 26.

Therefore, the winding rope 273 is wound and unwound by the jib derricking winch 244. In this manner, the upper spreader 272 moves close to and away from the lower spreader 271, and the tower strut 26 oscillates while the first connecting portion 264 serves as a fulcrum. The oscillation of the tower strut 26 is transmitted to the tower jib 25 via the pendant rope 267. In this manner, the tower jib 25 is configured to perform derricking on the tip side of the tower boom 24.

The main winding winch 245 is located in the vicinity of the upper side of the jib derricking winch 244, and is attached to the lower boom 241 of the tower boom 24. One end side of the main winding rope 256 is wound around the main winding winch 245. The other end of the main winding rope 256 is attached to a suspended load hook 28 via the guide sheave 248 of the sheave bracket 246, the guide sheave 254 of the tower jib 25, and the point sheave 255. Therefore, the main winding rope 256 is wound and unwound by the main winding winch 245 so that the suspended load hook 28 can be raised and lowered.

The backstop 225 is provided between the turning frame 221 and the lower boom 241 of the tower boom 24. The backstop 225 supports the standing tower boom 24 from behind.

A base end of the mast 224 is attached to the mast attachment portion 223 of the turning frame 221 to be pivotable. The tip of the mast 224 is a free end that is pivotable in upward, downward, forward, and rearward directions.

A boom spreader 228 is provided in the tip of the mast 224, and the boom spreader 228 and the upper boom 243 of the tower boom 24 are connected to each other via a pendant rope 229 having a certain length. In addition, a boom derricking rope 291 sequentially wound over the boom spreader 228 and a spreader (not illustrated) on the turning frame 221 side is wound around a tower boom derricking winch (not illustrated) provided in the turning frame 221.

Therefore, when the boom derricking rope 291 is wound by the tower boom derricking winch, the tower boom 24 can stand by pulling the pendant rope 229. On the other hand, when the boom derricking rope 291 is unwound by the tower boom derricking winch, the tower boom 24 can be laid down (lowered) to the ground side via the pendant rope 229.

Figure 5:
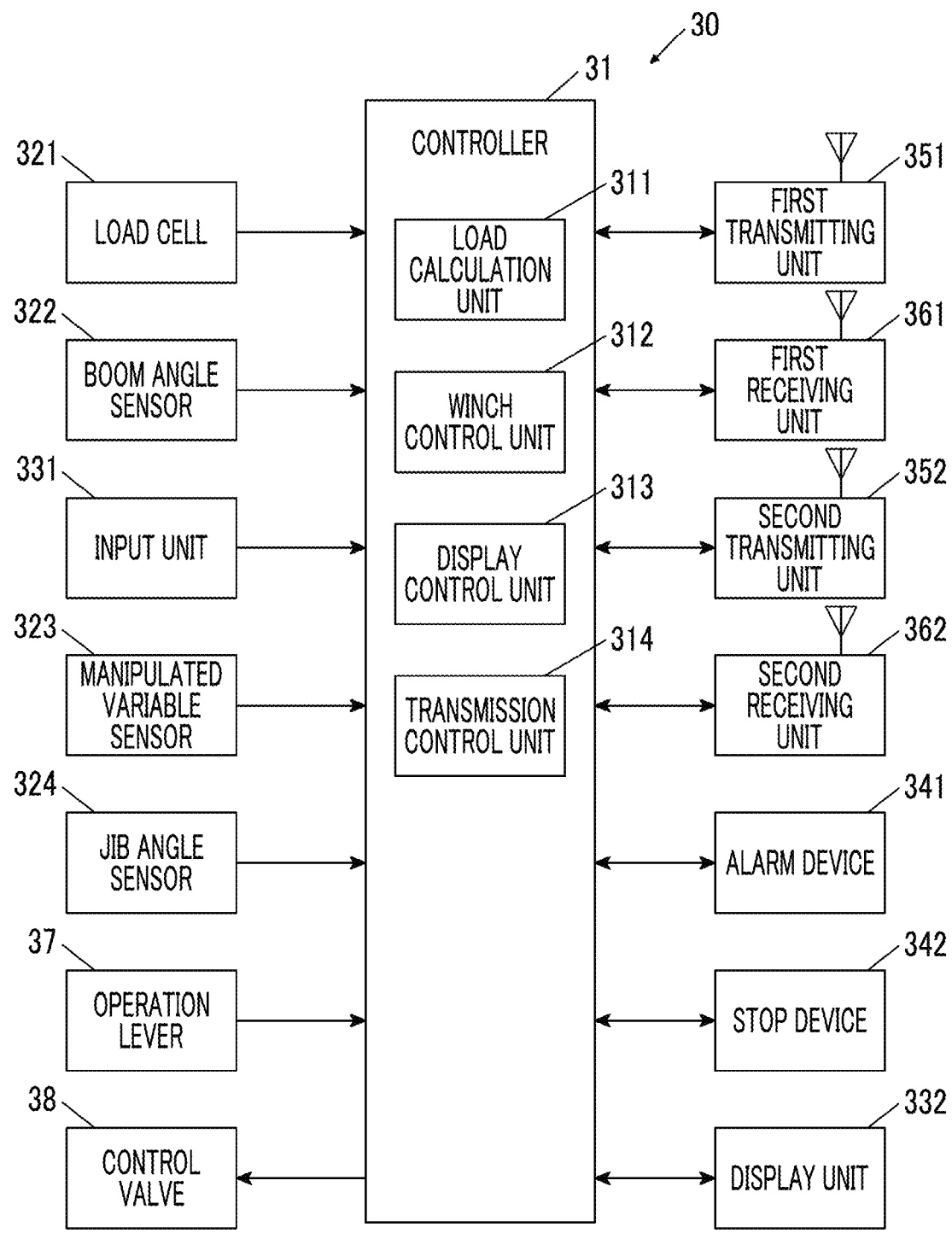
FIG. 5 is a block diagram illustrating a control system of the crane.

FIG. 5 is a block diagram illustrating a configuration of the crane terminal 30. The crane terminal 30 is a control terminal mounted on the crane 20, and performs control for various operations such as traveling, turning, and load suspending of the crane 20 and processing for abnormality detection.

The crane terminal 30 includes a controller 31 configured to include a CPU, a ROM and RAM which are storage devices, and a calculation processing device including other peripheral circuits.

As illustrated in FIG. 5, a load cell 321, a boom angle sensor 322, a manipulated variable sensor 323, a jib angle sensor 324, an input unit 331, a display unit 332, an alarm device 341, a stop device 342, and first and second transmitting units 351 and 352, first and second receiving units 361 and 362, an operation lever 37, and a control valve 38 are connected to the controller 31.

The load cell 321 is attached to the boom spreader 228, detects tension acting on the boom derricking rope 291 that causes the tower boom 24 to perform derricking, and outputs a control signal corresponding to the detected tension to the controller 31.

For example, the input unit 331 is a touch panel, and outputs a control signal corresponding to an operation from a worker to the controller 31. The worker can operate the input unit 331 to set the number of application times of the main winding rope 256, the length of the tower boom, and the mass of the suspended load hook 28.

The boom angle sensor 322 is attached to a base end side of the tower boom 24, detects a derricking angle (hereinafter, also referred to as a boom angle) of the tower boom 24, and outputs a control signal corresponding to the detected boom angle to the controller 31. For example, as the boom angle, the boom angle sensor 322 detects a ground angle which is an angle with respect to a horizontal plane.

The jib angle sensor 324 is attached to the base end side of the tower jib 25, detects a derricking angle (hereinafter, also referred to as a jib angle) of the tower jib 25, and outputs a control signal corresponding to the detected jib angle to the controller 31. For example, as the jib angle, the jib angle sensor 324 detects the ground angle which is the angle with respect to the horizontal plane.

For example, the manipulated variable sensor 323 detects a manipulated variable of a hydraulic pilot type operation lever, and outputs a control signal corresponding to the detected manipulated variable to the controller 31.

For example, the display unit 332 includes a touch panel type display that is also used as the input unit 331, and displays information on the suspended load or information on a work posture on a display screen, based on a control signal output from the controller 31.

The alarm device 341 issues an alarm, based on a control signal output from the controller 31.

The stop device 342 stops driving a hydraulic motor (not illustrated) connected to each of the main winding winch 245 and the jib derricking winch 244, based on a control signal output from the controller 31. For example, the stop device 342 is an electromagnetic switching valve which can cut off pressure oil supply from a hydraulic pump to a hydraulic motor.

The first transmitting unit 351 and the first receiving unit 361 communicate with the base station 120 via the satellite 110.

In addition, the second transmitting unit 352 and the second receiving unit 362 directly communicate with the base station 150.

The controller 31 functionally includes a load calculation unit 311, a winch control unit 312, a display control unit 313, and a transmission control unit 314.

The load calculation unit 311 calculates the suspended load applied to the suspended load hook 28, based on an output of the load cell 321 and the boom angle sensor 322.

The winch control unit 312 determines whether the suspended load is equal to or larger than a rated total load, outputs a stop signal to the stop device 342, and outputs an alarm signal to the alarm device 341, when the suspended load is equal to or greater than the rated total load. When the stop signal is input to the stop device 342, the driving of the jib derricking winch 244 and the main winding winch 245 is stopped. When the alarm signal is input to the alarm device 341, an alarm is issued.

The display control unit 313 controls an image to be displayed on the display screen of the display unit 332. The display control unit 313 displays the suspended load calculated by the load calculation unit 311 on the display screen of the display unit 332.

In addition, the display control unit 313 displays information managed by the management server 50 on the display screen of the display unit 332.

The transmission control unit 314 transmits information stored in the storage device of the controller 31 at a predetermined timing via the first transmitting unit 351 or the second transmitting unit 352. The information transmitted from the first transmitting unit 351 or the second transmitting unit 352 is received by the base stations 120 and 150, and is transmitted to the management server 50.

In addition, the transmission control unit 314 causes the first transmitting unit 351 or the second transmitting unit 352 to transmit pivoting angle information including the boom angle and the jib angle which are detected by the boom angle sensor 322 and the jib angle sensor 324 to each mobile unit 40.

Furthermore, the transmission control unit 314 causes the first transmitting unit 351 or the second transmitting unit 352 to transmit diagnostic information data received from each mobile unit 40 to the management server 50.

The control valve 38 is configured to include a plurality of valves that can be switched in accordance with a control signal from the controller 31.

For example, the control valve 38 includes a valve for hydraulic pressure supply, interruption, and rotation direction switching from the hydraulic pump included in the crane 20 to the hydraulic motor that rotationally drives drive wheels of the lower traveling body 21, a valve for hydraulic pressure supply, interruption, and rotation direction switching from the hydraulic pump to the hydraulic motor that performs a turning operation of the rotating platform 22, a valve for hydraulic pressure supply, interruption, and rotation direction switching from the hydraulic pump to the hydraulic motor that rotationally drives the tower boom derricking winch, a valve for hydraulic pressure supply, interruption, and rotation direction switching from the hydraulic pump to the hydraulic motor that rotationally drives the jib derricking winch 244, and a valve for hydraulic pressure supply, interruption, and rotation direction switching from the hydraulic pump to the hydraulic motor that rotationally drives the main winding winch 245.

The operation lever 37 is configured to include a plurality of levers for inputting control signals for individually performing switching to various valves of the control valve 38 through the controller 31.

For example, a traveling lever which is one of the operation levers 37 inputs a switching signal to a valve that performs hydraulic pressure supply, interruption, and rotation direction switching for the hydraulic motor that rotationally drives the drive wheels of the above-described lower traveling body 21.

In addition, a turning lever which is one of the operation levers 37 inputs a switching signal to a valve that performs hydraulic pressure supply, interruption, and rotation direction switching from the above-described hydraulic pump to the hydraulic motor that performs a turning operation of the rotating platform 22.

In addition, a boom derricking lever which is one of the operation levers 37 inputs a switching signal to a valve that performs hydraulic pressure supply, interruption, and rotation direction switching from the above-described hydraulic pump to the hydraulic motor that rotationally drives the tower boom derricking winch.

In addition, a jib derricking lever which is one of the operation levers 37 inputs a switching signal to a valve that performs hydraulic pressure supply, interruption, and rotation direction switching from the above-described hydraulic pump to the hydraulic motor that rotationally drives the jib derricking winch 244.

In addition, a winding lever which is one of the operation levers 37 inputs a switching signal to a valve that performs hydraulic pressure supply, interruption, and rotation direction switching from the above-described hydraulic pump to the hydraulic motor that rotationally drives the main winding winch 245.

The controller 31 inputs control signals corresponding to hydraulic pressure supply, interruption, and rotation direction switching to each valve configuring the corresponding control valve 38 in accordance with an operation of various levers configuring the operation lever 37, and performs control on each hydraulic motor.

In this manner, a worker can operate the operation lever 37 to perform a traveling operation of the crane 20, a turning operation of the rotating platform 22, a derricking operation of the tower boom 24, a derricking operation of the tower jib 25, and raising/lowering operations of the suspended load hook 28.

In an example of the above-described crane terminal 30, the following configurations have been described. A configuration for performing abnormality processing on the load cell 321, the boom angle sensor 322, the manipulated variable sensor 323, the jib angle sensor 324, a limit switch (not illustrated), the alarm device 341, and the stop device 342 and a configuration for performing a normal operation on the operation lever 37 and the control valve 38 are controlled by a unified control system. However, the configuration for performing the abnormality processing and the configuration for performing the normal operation may include an individual controller for controlling each configuration, and may be configured to form a separate system.

Management Server

Figure 6:
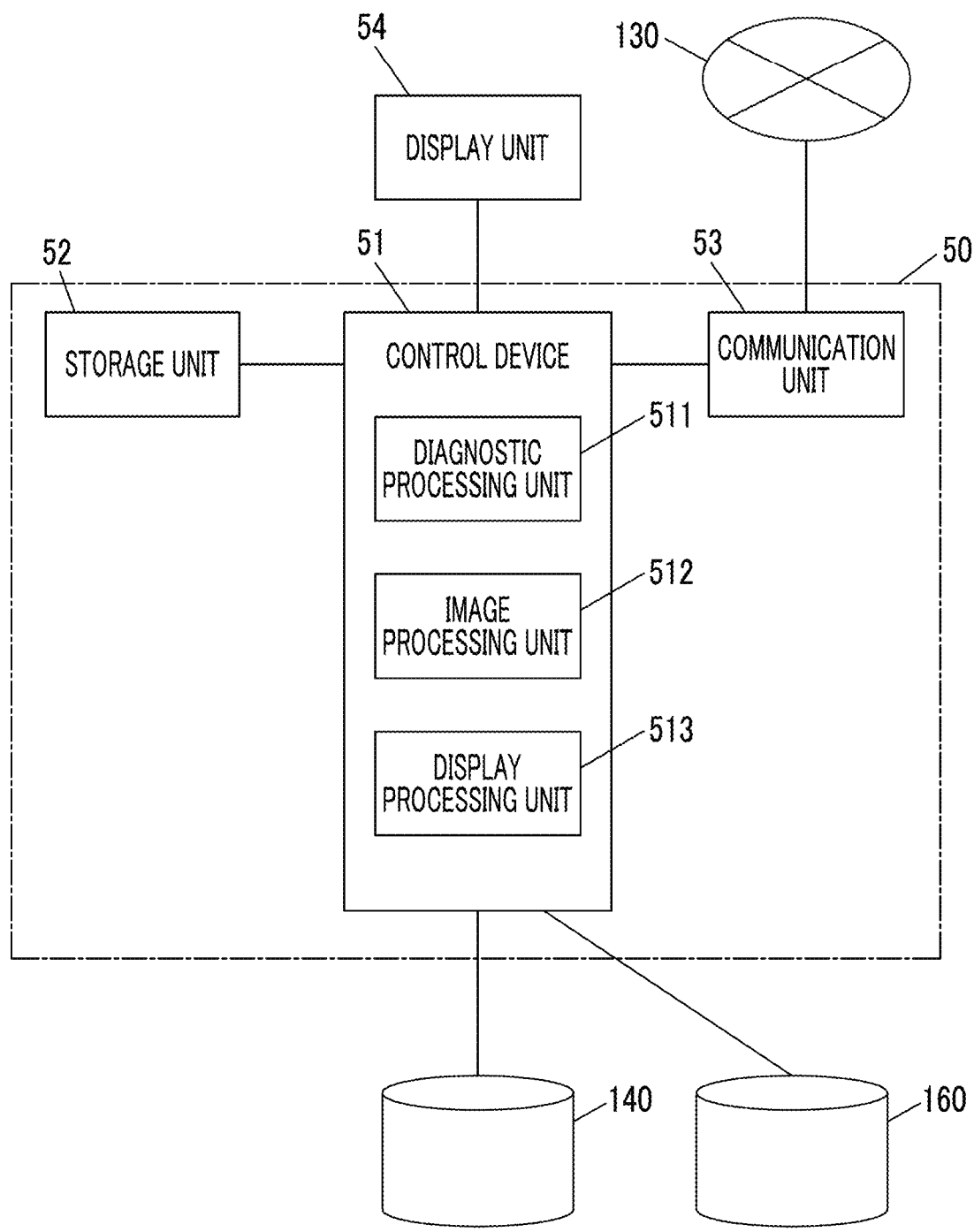
FIG. 6 is a block diagram illustrating a configuration of a management server.

FIG. 6 is a block diagram illustrating a configuration of the management server 50. The management server 50 includes a control device 51, a storage unit 52, and a communication unit 53.

The control device 51 is configured to include a calculation processing device having a CPU and peripheral circuits. The control device 51 controls each unit of the management server 50 by reading and executing a control program stored in advance in the storage unit 52.

For example, the storage unit 52 is a non-volatile storage device.

The communication unit 53 performs data communication (transmission and reception) via the network 130 in accordance with a predetermined procedure.

The display unit 54 is connected to the control device 51, and the control device 51 displays information stored in the storage unit 52, the inspection information database 140 of the crane, and the customer information database 160 on the display screen of the display unit 54.

The inspection information database 140 of the crane and the customer information database 160 are connected to the control device 51. FIG. 7 is a view illustrating an example of information stored in the inspection information database 140 of the crane.

The control device 51 causes the inspection information database 140 of the crane to store date and time information 141 indicating a reception date and time and a work machine ID 142 unique to the crane 20, and a diagnosis result 143 (to be described later) which are received from each mobile unit 40 via the base stations 120 and 150 (including a case via the crane terminal 30) in association with each other.

FIG. 8 is a view illustrating an example of information stored in the customer information database 160. The work machine ID 161 of the crane 20, one or more customer information 162 relating to a customer who owns the crane 20, and a delivery destination address 163 of one or more customers are stored in association with each other in the customer information database 160. The delivery destination address 163 of the customer which corresponds to one work machine ID 161 can be changed in any desired way. It is also possible to set a plurality of the delivery destination addresses 163 of the customer which correspond to one work machine ID 161.

In this manner, the control device 51 of the management server 50 specifies the customer and the delivery destination, when the information in the crane inspection information database 140 is updated for the specific crane 20, and transmits the updated information of the crane 20, or notifies the worker of the updated information.

In addition, when there is an access from the customer side, the control device 51 may allow transmitting or reading various information recorded in the inspection information database 140 of the crane relating to the crane 20 of the customer.

In this case, a password may be set for each customer in the customer information database 160, and the password may be requested when there is an access from the customer side. It is preferable that the password is registered in the customer information database 160.

The control device 51 functionally includes a diagnostic processing unit 511, an image processing unit 512, and a display processing unit 513.

Hereinafter, the units will be described in order.

Diagnostic Processing Unit

Based on the diagnostic information data including the captured image data and the detection data which are acquired from each mobile unit 40 for the crane 20, the diagnostic processing unit 511 performs diagnostic processing for determining whether or not there is an abnormality at the inspection locations of the crane 20 with regard to inspection items described below.

The inspection items are as follows.
  (1) Crack, deformation, and damage in the tower boom and the tower jib
  (2) Abrasion and damage in the foot pin, the joint pin, and the bush
  (3) Abrasion, damage, irregular winding, and a terminal state in the wire rope
  (4) Damage and corrosion in the pendant rope
  (5) Crack, deformation, and damage in each spreader, hanger, and tower strut
  (6) Crack, deformation, and abrasion in the suspended load hook
  (7) Operation state, deformation, and damage in a wire detachment stopper of the suspended load hook
  (8) Loosening of a nut of the suspended load hook, and damage or corrosion in a screw portion
  (9) Abrasion, deformation, and damage in each sheave
  (10) Operation state of an excessive winding prevention device for the suspended load hook, the tower boom, and the tower jib
  (11) Operation state of the load cell and the boom angle sensor
  (12) Deformation and damage in the backstop (1) Crack, Deformation, and Damage in the Tower Boom and the Tower Jib The diagnostic processing unit 511 determines whether or not there are crack, deformation, or damage, based on the captured image data of the tower boom 24 and the tower jib 25 which is included in the diagnostic information data from the mobile unit 40, and diagnoses whether or not there is an abnormality, based on a determination result.

With regard to "crack" and "damage", the diagnostic processing unit 511 detects "crack" or "damage" by using a pattern recognizing discriminator that defines parameters of the damage or the crack of the tower boom and tower jib which are acquired through machine. Then, when "crack" or "damage" is detected, the diagnostic processing unit 511 diagnoses that the inspection item is abnormal, and when not detected, the diagnostic processing unit 511 diagnoses that the inspection item is normal.

In addition, with regard to "deformation" the diagnostic processing unit 511 compares proper image data of the tower boom 24 or the tower jib 25 with the captured image data, and determines "deformation", based on a matching degree obtained by a well-known method such as pattern matching. Alternatively, as in the case of "crack" and "damage", a "deformation" portion may be detected by using the pattern recognizing discriminator that defines the parameters of the deformation.

(2) Abrasion and Damage in the Foot Pin, the Joint Pin, and the Bush

The diagnostic processing unit 511 determines whether or not there is abrasion or damage in the foot pin, the joint pin, and the bush which are used for the tower boom 24 and the tower jib 25, based on the captured image data of the tower boom 24 and the tower jib 25 which is included in the diagnostic information data from the mobile unit 40, and diagnoses whether or not there is an abnormality, based on a determination result.

With regard to "abrasion", the diagnostic processing unit 511 calculates dimensions of an abrasion portion, based on the captured image data of the foot pin, the joint pin, or the bush of the tower boom 24 or the tower jib 25, and acquires the amount of abrasion. Then, it is determined whether or not the amount of abrasion falls within a specified numerical range, and it is diagnosed whether or not there is the abnormality.

In addition, a method for detecting "damage" is the same as that in the previously described case.

(3) Abrasion, Damage, Irregular Winding, and a Terminal State in the Wire Rope

The diagnostic processing unit 511 determines whether or not there is abrasion, damage, or irregular winding in the main winding rope 256, the jib derricking rope 27, and the boom derricking rope 291, and determines quality of a terminal state, based on the captured image data of the tower boom 24 and the tower jib 25 which is included in the diagnostic information data from the mobile unit 40. The diagnostic processing unit 511 diagnoses whether or not there is the abnormality, based on determination results thereof.

With regard to "damage" and "irregular winding", the diagnostic processing unit 511 detects "damage" or "irregular winding" by using the pattern recognizing discriminator that defines the parameters of the damage and an irregular winding state of each rope which are acquired through machine learning. The damage and the irregular winding include occurrence of kink and occurrence of wire breakage.

Alternatively, a proper winding state may be detected by using the pattern recognizing discriminator that defines the parameters of the proper winding state of each rope. In these cases, when "irregular winding" is detected, it is diagnosed that the inspection item is abnormal, and when "proper winding state" is detected, it is diagnosed that the inspection item is normal.

In addition, with regard to the "terminal state", the diagnostic processing unit 511 detects an "abnormal state" of the terminal by using the pattern recognizing discriminator that defines the parameters of the abnormal state of the terminal of each rope which are acquired through machine learning. Alternatively, a "proper state" of the terminal may be detected by using the pattern recognizing discriminator that defines the parameters of the proper state of the terminal of each rope. In these cases, when "abnormal state" is detected, it is diagnosed that the inspection item is abnormal, and when "proper state" is detected, it is diagnosed that the inspection item is normal.

In addition, a method for detecting "abrasion" and "damage" is the same as that in the previously described case.

(4) Damage and Corrosion in the Pendant Rope

The diagnostic processing unit 511 determines whether or not there is damage or corrosion in the pendant rope 267 and the boom-side pendant rope 274, based on the captured image data of the tower boom 24 and the tower jib 25 which is included in the diagnostic information data from the mobile unit 40, and diagnoses whether or not there is an abnormality, based on determination results thereof.

With regard to the "corrosion", the diagnostic processing unit 511 detects the "corrosion" by using the pattern recognizing discriminator that defines the parameters of a corrosion state of the pendant rope which are acquired through machine learning. Then, when "corrosion" is detected, it is diagnosed that inspection item is abnormal, and when not detected, it is diagnosed that the inspection item is normal.

In addition, a method for detecting "damage" is the same as that in the previously described case.

(5) Crack, Deformation, and Damage in Each Spreader and Tower Strut

The diagnostic processing unit 511 determines whether or not there is crack, deformation, or damage in the boom spreader 228, the lower spreader 271, the upper spreader 272, and the tower strut 26, based on the captured image data of the tower boom 24 and the tower jib 25 which is included in the diagnostic information data from the mobile unit 40, and diagnoses whether or not there is an abnormality, based on a determination result.

A method for detecting "crack", "deformation", and "damage" is the same as that in the previously described case.

(6) Crack, Deformation, and Abrasion in the Suspended Load Hook

The diagnostic processing unit 511 determines whether or not there is crack, deformation, or abrasion of the suspended load hook 28, based on the captured image data of the tower jib 25 which is included in the diagnostic information data from the mobile unit 40, and diagnoses whether or not there is an abnormality, based on a determination result.

A method for detecting "crack", "deformation", and "abrasion" is the same as that in the previously described case.

(7) Operation State, Deformation, and Damage in a Wire Detachment Stopper of the Suspended Load Hook The diagnostic processing unit 511 determines an operation state in the wire detachment stopper provided in the suspended load hook 28 and whether or not there is deformation or damage, based on the captured image data of the tower jib 25 which is included in the diagnostic information data from the mobile unit 40, and diagnoses whether or not there is an abnormality, based on a determination result.

With regard to the "operation state", the diagnostic processing unit 511 compares each of the captured image in a state before an operation and the captured image in a state after an operation with an image in a state before a proper operation or an image in a state after a proper operation, and determines whether or not a comparison result is correct, based on a matching degree obtained by a well-known method such as pattern matching.

In addition, the method for detecting "deformation" and "damage" is the same as that in the previously described case.

(8) Loosening of a Nut of the Suspended Load Hook, and Damage or Corrosion in a Screw Portion The diagnostic processing unit 511 determines whether or not the nut provided in the suspended load hook 28 is loosened, and the screw portion is damaged or corroded, based on the captured image data of the tower jib 25 which is included in the diagnostic information data from the mobile unit 40, and diagnoses whether or not there is an abnormality, based on a determination result.

With regard to the "loosening of the nut", the diagnostic processing unit 511 compares the captured image of the nut with either an image in a loosened state of the nut or an image in a tightened state of the nut, and determines whether or not a comparison result is correct, based on a matching degree obtained by a well-known method such as pattern matching. When the captured image of the nut matches the image in the loosened state of the nut, it is diagnosed that the inspection item is abnormal, and when the captured image of the nut matches the image in the tightened state of the nut, it is diagnosed that the inspection item is normal.

Alternatively, a protruding length of the nut from an attachment position may be calculated from the captured image of the nut, and when the protruding length is equal to or longer than a specified length, it may be diagnosed that the inspection item is abnormal.

The method for detecting "damage" and "corrosion" is the same as that in the previously described case.

(9) Abrasion, Deformation, and Damage in Each Sheave

The diagnostic processing unit 511 determines whether or not there is abrasion of a groove portion of the tower guide sheave 247, the guide sheave 248, 254, and the point sheave 255, and overall deformation and damage, based on the captured image data of the tower boom 24 and the tower jib 25 which is included in the diagnostic information data from the mobile unit 40, and diagnoses whether or not there is an abnormality, based on a determination result.

A method for detecting "abrasion", "deformation", and "damage" is the same as that in the previously described case.

(10) Operation State of an Excessive Winding Prevention Device for the Suspended Load Hook, the Tower Boom, and the Tower Jib The diagnostic processing unit 511 diagnoses whether the operation state of the excessive winding prevention device of the wire rope provided in the tower jib 25 is normal or abnormal, based on the captured image data of the tower jib 25 which is included in the diagnostic information data from the mobile unit 40.

The diagnostic processing unit 511 determines whether or not the excessive winding prevention device is correct, based on a fact that the excessive winding prevention device stops the suspended load hook 28, the tower boom 24, and the tower jib 25 at a stop position before excessive winding occurs during a normal operation, in accordance with whether or not the stop position of the captured image in a stopped state thereof falls within a proper range. That is, the diagnostic processing unit 511 calculates a height of the suspended load hook 28, a tilt angle of the tower boom 24, and a tilt angle of the tower jib 25, based on the captured image, and diagnoses whether or not there is an abnormality, based on numerical values thereof.

(11) Operation State of the Load Cell and the Boom Angle Sensor

The diagnostic processing unit 511 diagnoses whether the inspection item is normal or abnormal, based on the detection data of the load cell 321 and the boom angle sensor 322 which is included in the diagnostic information data from the crane terminal 30, and based on detected numerical values thereof.

(12) Operation, Deformation, and Damage in the Backstop

The diagnostic processing unit 511 determines whether or not there is deformation or damage in the backstop 225, based on the captured image data of the tower boom 24 which is included in the diagnostic information data from the mobile unit 40, and diagnoses whether or not there is an abnormality, based on a determination result.

A method for detecting "deformation" and "damage" is the same as that in the previously described case.

The diagnostic processing unit 511 diagnoses the inspection items (1) to (12) above, and records a diagnosis result together with date and time information of the imaging as a portion of state information data of the corresponding crane 20 in the inspection information database 140.

Image Processing Unit

The image processing unit 512 processes the captured image data into processed image data suitable for a user to determine the abnormality, based on the captured image data included in the diagnostic information data acquired from each mobile unit 40 for the crane 20.

The image processing unit 512 prepares three-dimensional model processed image data of the crane 20, as the processed image data suitable for the user to determine the abnormality.

The image processing unit 512 generates the three-dimensional model processed image data, based on the captured image data included in the diagnostic information data acquired from each mobile unit 40.

The captured image data for each frame is accompanied by data indicating an imaging position and an orientation of the mobile unit 40. Accordingly, common feature points are extracted inside a plurality of images of the captured image data which are obtained by imaging the same portion of the crane 20, and a position inside each of the images is specified. In this manner, three-dimensional coordinates of the feature point can be calculated.

Therefore, a plurality of feature points are extracted from the captured image for the inspection locations of the crane 20, the three-dimensional coordinates are calculated, and the feature points are connected to each other. In this manner, the three-dimensional model processed image data can be generated for the inspection locations of the crane 20. The three-dimensional model processed image data can display an external shape of each part of the crane 20 in all directions. Accordingly, whether or not there is the abnormality in the crane 20 can be diagnosed by using the three-dimensional model processed image data.

When an infrared camera or a stereo camera is mounted as the camera 41 of each mobile unit 40, distance data can be obtained for each pixel of the captured image. Accordingly, the three-dimensional model processed image data can more accurately be generated.

In addition, even in a configuration in which each mobile unit 40 is not equipped with the positioning unit 421 which can acquire position coordinates by using the GPS, when a movement speed of the mobile unit 40 can be detected during the imaging in continuous frames, the plurality of feature points can be extracted from the captured image by using the above-described method, and the three-dimensional model processed image data can be generated.

The image processing unit 512 records the prepared three-dimensional model processed image data of the crane 20 together with the date and time information of the imaging, as a part of the state information data of the corresponding crane 20 in the inspection information database 140.

Display Processing Unit

The display processing unit 513 performs display processing of various information registered in the crane inspection information database 140, as the state information data indicating a state of the crane 20.

For example, the state information in the state information data to be displayed includes the diagnosis result of the crane 20 which is obtained by the diagnostic processing unit 511, the three-dimensional model processed image of the crane 20 which is obtained by the image processing unit 512, the captured image based on the captured image data acquired from the mobile unit 40, character information relating to the captured image (imaging location of the crane 20, imaging date and time), and information on detection data acquired from the mobile unit 40. When the number of the captured images is enormous, for example, only some of representative images used for diagnosis may be selected.

In addition, the display processing unit 513 is not limited to the display on the display unit 54 connected to the management server 50, and may display the captured image on the external information terminals 60 and 70 or the crane terminal 30 from the communication unit 53 via the network 130.

In addition, when the display processing is performed on the external terminals 30, 60, and 70, which customer is a partner to be displayed may be confirmed with reference to the customer information database 160, and thereafter, the display processing may be limited to display only the state information relating to the crane 20 of the customer. In addition, in the display processing, the state information data may be transmitted to the terminals 30, 60, and 70 of the customers, or the state information data may be only readable without being transmitted thereto.

Technical Effects of Embodiments of Invention

The above-described crane inspection system 100 includes a server 50 serving as a processing unit that performs predetermined processing on the captured image data obtained by each mobile unit 40 moving around the crane 20. Therefore, even when the inspection work is carried out for an object reaching a high place, such as the boom or the jib of the crane 20, the inspection work of the crane 20 can easily be carried out.

In addition, the diagnostic processing unit 511 of the management server 50 determines whether or not there is an abnormality at the inspection location of the crane 20, based on the captured image data. Accordingly, it is possible to objectively, easily, and quickly determine the abnormality. Therefore, the inspection work can more efficiently and more easily be carried out.

In addition, the image processing unit 512 of the management server 50 performs processing for processing the captured image data into the processed image data suitable for a user to determine the abnormality. Accordingly, compared to a case of simply viewing the captured image, the abnormality can easily and accurately be determined.

In particular, the three-dimensional model data of the crane 20 is prepared as the processed image data. Accordingly, the three-dimensional model processed image data can display the external shape of each part of the crane 20 in all directions. Even when a user is away from a jobsite of the crane 20, the abnormality can more precisely be determined as if the user is located at the jobsite.

In addition, the display processing unit 513 of the management server 50 collects the state information data indicating the state of the crane 20 in the inspection information database 140, and performs display processing for displaying the state information included in the state information data and the processed image based on the processed image data to the user.

Therefore, the user can identify the state of the crane 20 without visiting the jobsite where the crane 20 is located, and can efficiently perform maintenance management.

In addition, the mobile unit 40 transmits the captured image data to the crane terminal 30 belonging to the crane 20, and the management server 50 collects the state information data indicating the state of the crane 20 and the captured image data from the crane terminal 30.

Therefore, the management server 50 can collect the captured image data by using the existing network to which the crane terminal 30 is connected, can eliminate a network connection environment of the mobile unit 40, and can easily build the crane inspection system.

In addition, the mobile unit 40 acquires derricking information indicating a derricking state of the tower boom 24 of the crane 20 from the crane terminal 30, and specifies an imaging position, based on the derricking information. Accordingly, even when the crane 20 changes a posture, proper captured image data can be acquired.

Furthermore, the mobile unit 40 includes the microphone 425 and temperature sensor 426 which are sensors different from the camera 41, and causes the sensors to perform sensing on the crane 20. Accordingly, various data can be collected, and more accurate diagnosis can be performed on the crane.

In addition, the first mobile unit 40A and the second mobile unit 40B separately image the first region and the second region. Accordingly, when there are a plurality of the inspection locations of the crane 20, the imaging work can efficiently be carried out.

In addition, when the first mobile unit 40A having the camera 41 and the second mobile unit 40B having the microphone 425 and the temperature sensor 426 are configured to separately perform the imaging and the sensing, the first mobile unit 40A can be moved to only a position suitable for the imaging as a route, and the second mobile unit 40B can be moved to only a position suitable for the sensing as a route. Accordingly, diagnostic information data can efficiently be collected.

In addition, when the mobile unit 40 (including the mobile units 40f and 40g to be described later) is configured to move along the guide members 102 to 104 provided in the crane 20, satisfactory captured image data can be acquired by suppressing vibration generation in the mobile unit 40.

In addition, when the guide member is provided inside the tower boom 24 of the crane 20 and the mobile unit 40 is configured to move inside the tower boom 24, in a case of the mobile unit 40 moving in a flying manner, the imaging and the sensing can also be performed on the inside of the tower boom 24 into which the mobile unit 40 cannot be inserted since there is a possibility of contact with the surroundings.

Others

In addition, details in the above-described embodiments of the invention can be appropriately changed within the scope not departing from the concept of the invention.

For example, in the above-described crane inspection system 100, the tower crane has been described as an example of the crane 20. However, the present invention is not limited thereto. In addition to the mobile type crane such as a crawler crane, a wheel crane, and a truck crane, the inspection system 100 is applicable to various cranes such as a port crane, a ceiling crane, a jib crane, a portal crane, an unloader, and a stationary type crane.

In addition, without being limited to the crane including the suspended load hook, a crane for suspending an attachment such as a magnet and an earth drill bucket is also an applicable object of the present invention.

In addition, the inspection items in the above-described diagnostic processing unit 511 are examples, and may include some or other inspection items thereof. In particular, when the present invention is applied to various cranes as described above, it is preferable that diagnostic processing is performed on more proper inspection items in accordance with a type of the cranes.

In addition, in various diagnostic applications, the abnormal location is detected from the captured image data by using the pattern recognizing discriminator. However, the present invention is not limited thereto. For example, the abnormal location may be detected by a well-known method such as pattern matching.

Example (1) of the Mobile Unit Supported by the Guide Member

An example (1) of the mobile unit supported by the guide members 102 to 104 will be described in detail with reference to the drawings.

Figure 9:
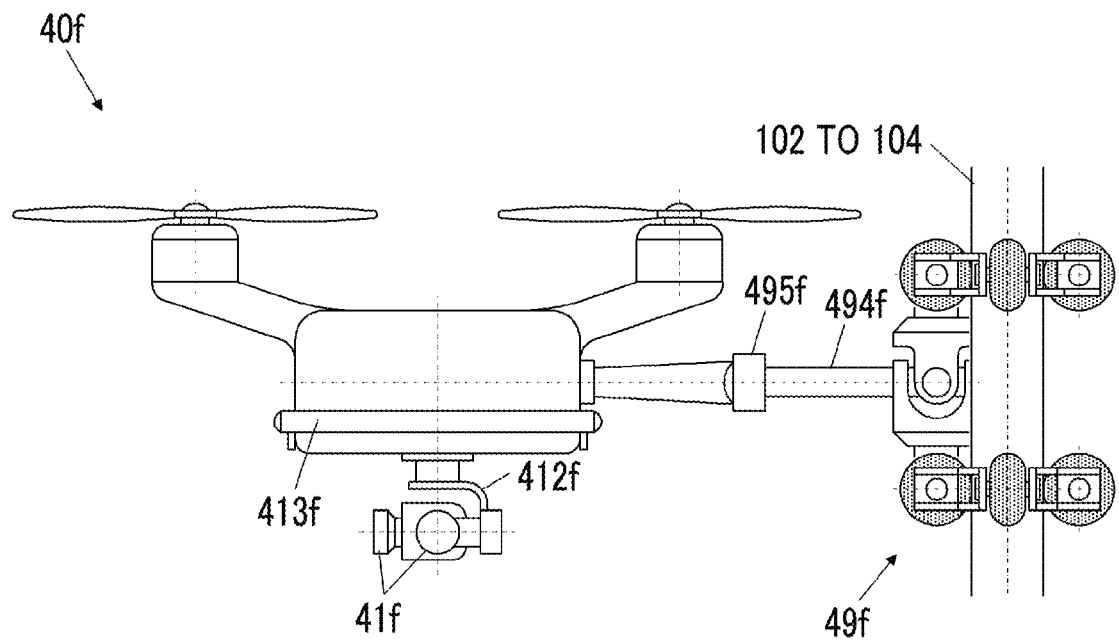
FIG. 9 is a front view of a mobile unit illustrated in an example (1) of the mobile unit supported by a guide member.
Figure 10:
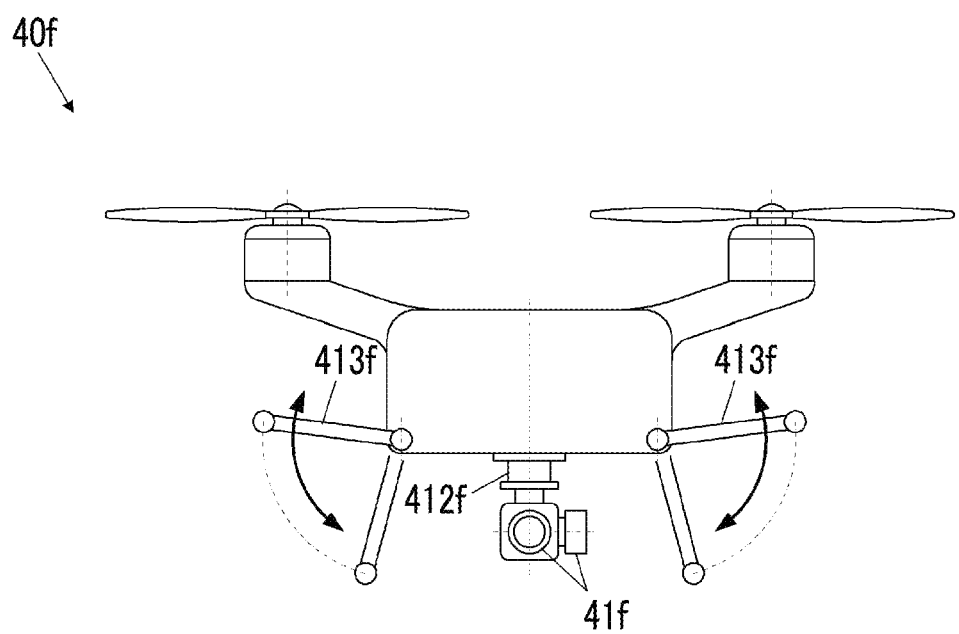
FIG. 10 is a side surface view of the mobile unit illustrated in the example (1) of the mobile unit supported by the guide member.
Figure 11:
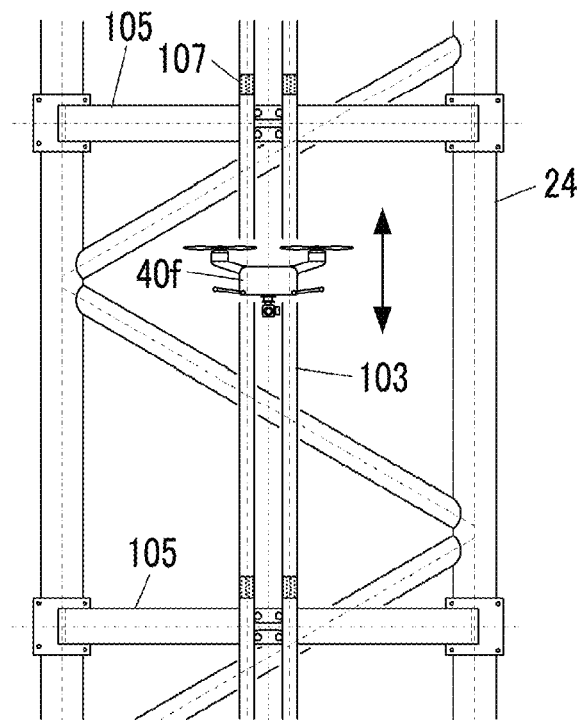
FIG. 11 is a left side view of the mobile unit supported by the guide member.
Figure 12:
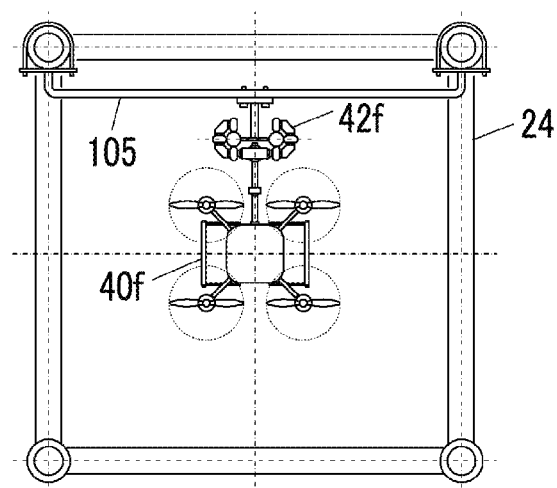
FIG. 12 is a plan view of the mobile unit supported by the guide member.

FIG. 9 is a front view of the mobile unit 40f, FIG. 10 is a left side view, FIG. 11 is a left side view of the mobile unit 40f supported by the guide member 103, and FIG. 12 is a plan view.

The mobile unit 40f is a so-called drone that moves by obtaining thrust generated from a plurality of rotors. As illustrated in FIGS. 9 and 10, a lower part of a machine body is equipped with cameras 41f for individually imaging front/rear/right/left sides via gimbal mechanism 412f.

The gimbal mechanism 412f supports the cameras 41f so that an orientation of each of the cameras 41f can be changed and adjusted around three axes in a vertically upward/down direction, a rightward/leftward direction, and a forward/rearward direction.

In addition, a pair of leg portions 413f is provided in the lower part of the machine body. When the mobile unit 40f lands, the pair of leg portions 413f pivots downward to guard each of the cameras 41f, and is retracted upward not to interfere with the imaging during the movement.

A support member 494f extending leftward from a slider 49f that can slide along the guide members 102 to 104 is connected to a right side surface of the mobile unit 40f. A ball joint 495f is provided in an intermediate portion of the support member 494f. The mobile unit 40f is allowed to slightly oscillate upward, downward, forward, and rearward, and a posture of the mobile unit 40f can be changed around right and left axes.

FIGS. 11 and 12 illustrate the guide member 103 supported by the tower boom 24. The tower boom 24 includes four main pipes disposed in a box shape along a longitudinal direction of the boom. Inside the four main pipes, the two guide members 103 in a pair are supported in parallel with the main pipe by suspension members 105 suspended and installed at a regular interval between the two main pipes. Each of the pair of guide members 103 is formed of a round pipe having a constant length, and is connected by a rubber joint 107 to have a required length.

The other guide members 102 and 104 are also supported by the same configuration and the same support structure.

Figure 13:
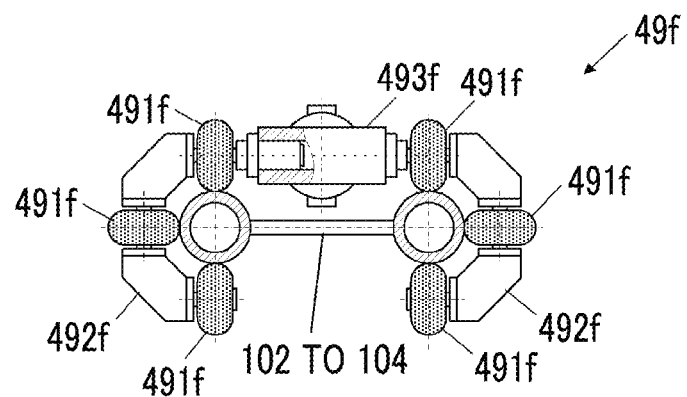
FIG. 13 is a plan view of a slider that enables the mobile unit to slide along the guide member.
Figure 14:
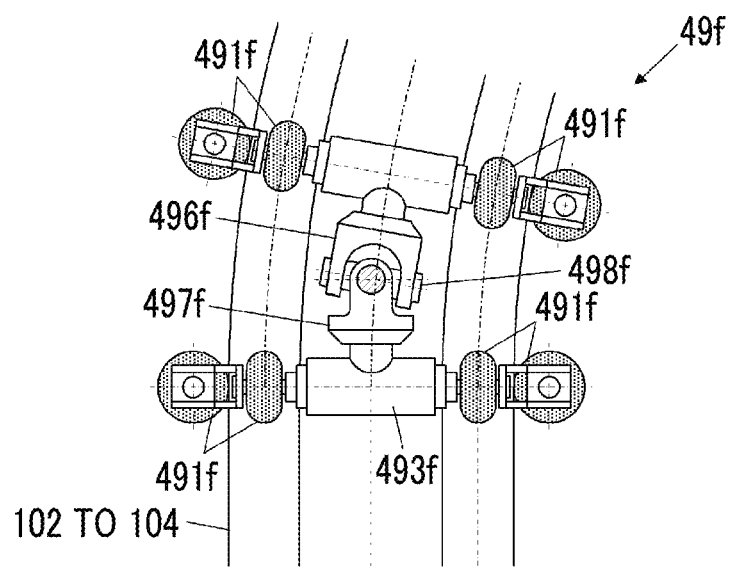
FIG. 14 is a left side view of the slider.
Figure 15:
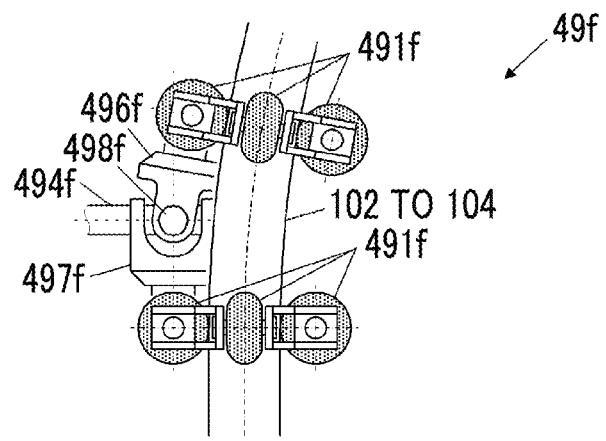
FIG. 15 is a plan view of the slider.

FIG. 13 is a plan view of the slider 49f that enables the mobile unit 40f to slide along the guide members 102 to 104, FIG. 14 is a left side view of the slider 49f, and FIG. 15 is a front view.

The slider 49f includes two upper and lower units including three wheels 491f provided on right, left, and rear sides of the guide members 102 to 104 on the front side of the pair of guide members 102 to 104 aligned forward and rearward, three wheels 491f provided on right, left, and rear sides of the guide members 102 to 104 on the rear side, a pair of support frames 492f rotatably supporting the pair of guide members 102 to 104 in an disposition where the wheels 491f surround the pair of guide members 102 to 104, and a connection body 493f supporting the pair of support frames 492f to be pivotable around the axis along the forward/rearward direction.

Furthermore, the slider 49f is connected by a support body 496f supporting the upper unit around the axis in the upward/downward direction, a support body 497f supporting the lower unit around the axis in the upward/downward direction, and a coupling shaft 498f that enables the upper and lower support bodies 496f and 497f to pivot around the axis in the forward/rearward direction and around the axis in the rightward/leftward direction, and the coupling shaft 498f is connected to the above-described support member 494f.

The mobile unit 40f is supported by the guide member 103 in the above-described disposition. In this manner, the mobile unit 40f can capture the images in all directions inside the tower boom 24.

In addition, the pair of guide members 102 to 104 is surrounded by the six wheels 491f from all sides. Accordingly, it is possible to prevent the mobile unit 40f from turning around the guide members 102 to 104, and the mobile unit 40f can capture the images while performing a stable moving operation.

In addition, as illustrated in FIGS. 14 and 15, even when the guide members 102 to 104 are curved in any direction, the above-described structure of the slider 49f allows a difference in the orientation of the upper and lower units, the mobile unit 40f can smoothly move along the curved guide members 102 to 104.

In addition, the mobile unit 40f can move by applying traveling power from a drive source to the wheels in contact with the guide members 102 to 104. However, the mobile unit 40f is configured to obtain thrust by the rotation of the rotor. In this manner, the mobile unit 40f can stably move without slipping in the wheels. In addition, in a case of the wheels, a mechanical configuration for transmitting power to the wheels is complicated. However, in a case of the rotor, the configuration can be simplified without such problem.

FIGS. 11 and 12 illustrate a configuration in which the mobile unit 40f can move along the guide member 103 provided inside the tower boom 24. However, the guide member 104 is also supported by the same configuration inside the tower jib 25. In this manner, the mobile unit 40f can capture the images inside the tower jib 25. Similarly, the guide member 102 is provided by applying the similar support structure to the side surface of the lower traveling body 21 or the rotating platform 22. In this manner, it is possible to image the lower traveling body 21 or the rotating platform 22.

Example (2) of the Mobile Unit Supported by the Guide Member

An example (2) of the mobile unit supported by the guide members 102 to 104 will be described in detail with reference to the drawings.

Figure 16:
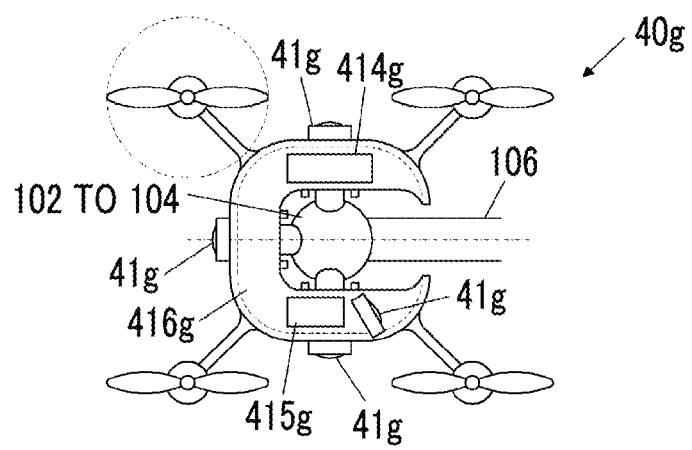
FIG. 16 is a plan view of a mobile unit illustrated in an example (2) of the mobile unit supported by the guide member.
Figure 17:
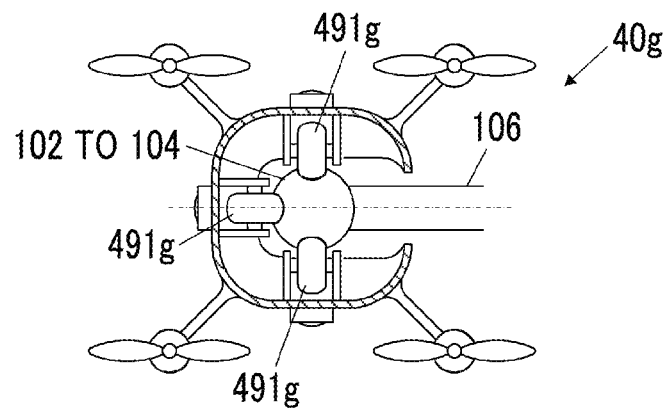
FIG. 17 is a plan view in which a machine body upper surface of the mobile unit is removed.
Figure 18:
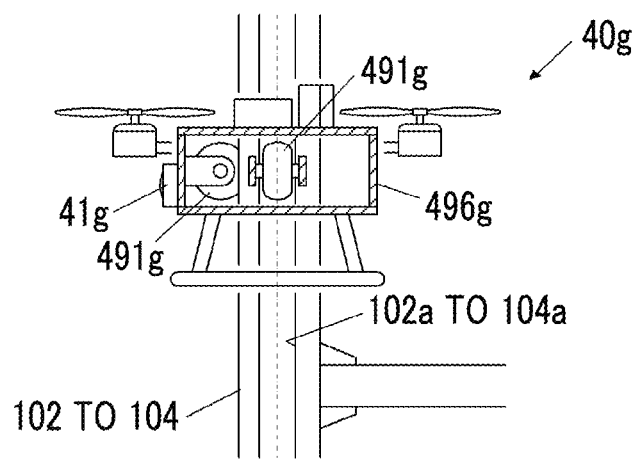
FIG. 18 is a front view in which a machine body side wall is cut out.
Figure 19:
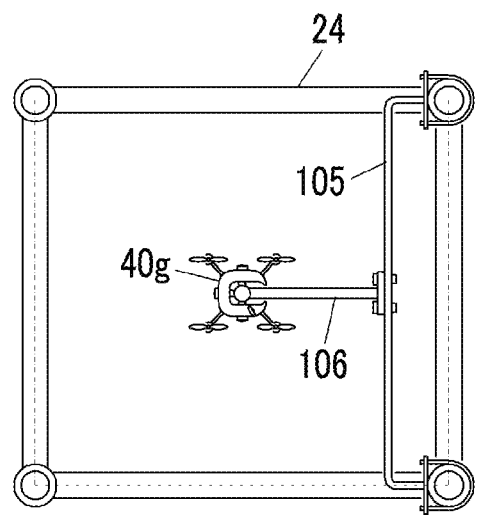
FIG. 19 is a plan view of the mobile unit supported by the guide member.
Figure 20:
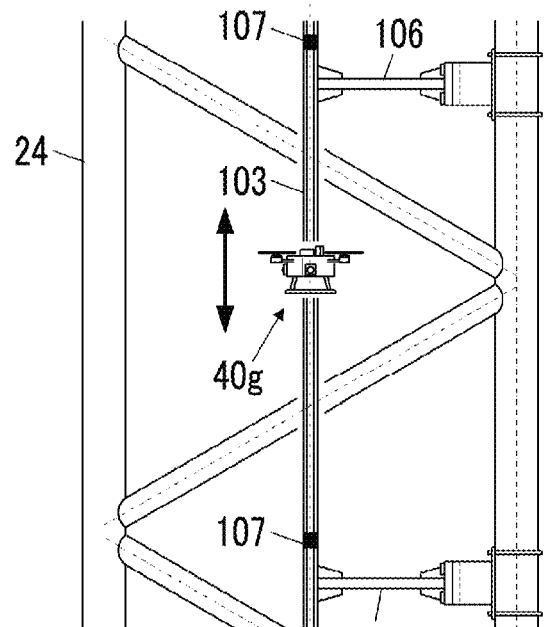
FIG. 20 is a left side view of the mobile unit supported by the guide member.

FIG. 16 is a plan view of the above-described mobile unit 40g. FIG. 17 is a plan view in which an upper surface 416g of the machine body of the mobile unit 40g is removed. FIG. 18 is a front view in which a sidewall 496g of the machine body is cut out. FIG. 19 is a plan view of the mobile unit 40f supported by the guide member 103. FIG. 20 is a front view.

The mobile unit 40g is also a so-called drone that moves by obtaining thrust generated from a plurality of rotors, and moves along one of the guide members 102 to 104 as illustrated in FIGS. 16 to 18.

As illustrated in FIGS. 19 and 20, the guide member (FIGS. 19 and 20 illustrate the guide member 103 supported by the tower boom 24) is disposed in the center of the tower boom 24 inside the four main pipes disposed in a box shape along the longitudinal direction of the boom of the tower boom 24.

For example, the guide member 103 is supported at a regular interval by support columns 106 extending from the suspension member 105 suspended and installed at a regular interval between two main pipes out of four main pipes of the tower boom 24.

The guide member 103 is formed of a round pipe having a constant length, and is connected by the rubber joint 107 to have a required length. In this manner, the mobile unit 40 can stably move.

The other guide members 102 and 104 are also supported by the same configuration and the same support structure.

In the mobile unit 40g, three cameras 41g for individually imaging the front, rear, and left sides are provided on an outer wall of the machine body, and only the camera 41g for imaging the right side is provided on the upper surface 416g of the machine body to be disposed to avoid the support column 106 supporting the guide member 103.

In addition, a power supply unit 414g and a control unit 415g are provided on the upper surface 416g of the machine body.

The guide members 102 to 104 penetrate upward and downward in the center of the machine body of the mobile unit 40g.

The guide members 102 to 104 have guide grooves at three locations on the front, rear, and left sides of the outer periphery along the longitudinal direction. Then, three wheels 491g in contact with and fitted to each of the guide grooves 102a to 104a of the guide members 102 to 104 from the three front, rear, and left sides are supported to be rotatable inside the machine body of the mobile unit 40g. The wheels 491g enable the mobile unit 40g to slide along the guide members 102 to 104.

The mobile unit 40g is supported by the guide member 103 in the above-described disposition. In this manner, the mobile unit 40g can capture the images in all directions inside the tower boom 24.

In addition, each of the guide members 102 to 104 is surrounded by the three wheels 491 g from three sides. Accordingly, it is possible to prevent the mobile unit 40g from turning around the guide members 102 to 104, and the mobile unit 40g can capture the images while performing a stable moving operation.

In addition, the mobile unit 40g has a configuration in which each of the guide members 102 to 104 is surrounded by the three wheels 491g. Accordingly, there is little influence even when the guide members 102 to 104 are curved in any direction, and the mobile unit 40g can smoothly move along the curved guide members 102 to 104.

In addition, the mobile unit 40g can also move by applying traveling power from a drive source to the wheels in contact with the guide members 102 to 104. However, the mobile unit 40g is configured to obtain the thrust by the rotation of the rotor. In this manner, stable movement without slippage and a simplified configuration can be realized.

FIGS. 19 and 20 illustrate a configuration in which the mobile unit 40g can move along the guide member 103 provided inside the tower boom 24. However, the guide member 104 is also supported by the same configuration inside the tower jib 25. In this manner, the mobile unit 40f can capture the images inside the tower jib 25. Similarly, the guide member 102 is provided by applying the similar support structure to the side surface of the lower traveling body 21 or the rotating platform 22. In this manner, it is possible to image the lower traveling body 21 or the rotating platform 22.

The mobile unit 40 may be used as a monitoring body around the crane by imaging the surroundings of the lower traveling body 21 or the rotating platform 22. In addition, the mobile unit 40 may be used as a suspended load monitoring body by imaging the periphery of the suspended load hook of the crane. That is, the imaging of the mobile unit 40 may be used for imaging in supporting the crane work in addition to the inspection work.

In addition, an example has been described in which the guide member 103 is supported by the support column 106 extending from the suspension member 105 suspended in the two main pipes of the tower boom 24. However, the support structure is not limited thereto.

Figure 21:
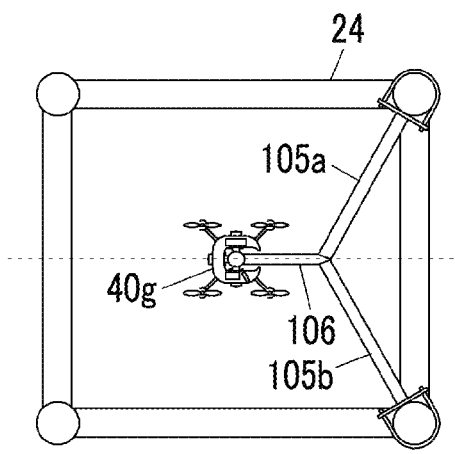
FIG. 21 is a plan view illustrating another support structure of the guide member.

For example, as illustrated in FIG. 21, a configuration may be adopted as follows. The tip portions of the two support pipes 105a and 105b individually extending to the vicinity in the center from the two main pipes of the tower boom 24 are connected together with the base end portion of the support column 106, and the guide member 103 is supported by the tip portion of the support column 106. In addition, the same support structure may also be applied to the guide members 102 and 104.

The mobile unit 40g illustrated in FIGS. 16 to 20 may have a support configuration in which the three wheels 491g are pressed against the guide members 102 to 104 side via a spring and a damper.

In addition, a configuration may be adopted as follows. A rail-shaped electrode along the guide members 102 to 104 is provided in the vicinity of one of the guide grooves 102a to 104a of the guide members 102 to 104. A power supply brush that slides on the rail-shaped electrode is provided on the mobile unit 40g side so that power is supplied to the mobile unit 40g from the guide members 102 to 104.

The crane inspection system according to the present invention has industrial applicability for the crane inspection system including the mobile unit moving around the crane.

It should be understood that the invention is not limited to the above-described embodiment, but may be modified into various forms on the basis of the spirit of the invention. Additionally, the modifications are included in the scope of the invention.

What is claimed is:

1. A crane inspection system comprising:
    a drone including an imaging unit, wherein the drone is configured to fly around a crane or to move along a guide member provided in the crane, in which the crane includes a boom capable of derricking; and
    a controller configured to perform predetermined processing on captured image data captured by the imaging unit,
    wherein the drone is configured to
        move to an imaging position based on a derricking angle of the boom detected by a sensor included in the crane, and
        image a plurality of locations including an inspection location of the crane, and
    the controller is configured to perform at least one of
        diagnostic processing for determining whether or not an abnormality occurs at the inspection location of the crane, based on the captured image data,
        processing for processing the captured image data into processed image data suitable for a user to determine the abnormality, or
        display processing for displaying a processed image based on the processed image data to the user.

2. The crane inspection system according to claim 1, wherein the controller is configured to perform processing for preparing three-dimensional model data of the crane as the processed image data, based on a plurality of the captured image data.

3. The crane inspection system according to claim 1, wherein the controller is configured to collect state information data indicating a state of the crane, and perform the display processing for displaying state information included in the state information data and the processed image based on the processed image data to the user.

4. The crane inspection system according to claim 1, wherein the drone is configured to transmit the captured image data to the crane, and the controller is configured to collect state information data indicating a state of the crane and the captured image data from the crane.

5. The crane inspection system according to claim 1,
wherein the drone includes a sensor different from the imaging unit, and causes the sensor to sense the crane.

6. The crane inspection system according to claim 1,
wherein a first drone configured to image a first region of the crane, and a second drone configured to image a second region different from the first region of the crane are provided.

7. The crane inspection system according to claim 1,
wherein a first drone having the imaging unit, and a second drone having a sensor different from the imaging unit are provided.

8. The crane inspection system according to claim 1,
wherein the guide member is provided inside the boom of the crane, and the drone moves inside the boom.

9. A crane inspected by the crane inspection system according to claim 1, the crane comprising:
the boom capable of derricking,
wherein the boom has the guide member along which the drone having the imaging unit moves, and
the crane is configured to detect a derricking angle of the boom to specify an imaging position of the drone.

10. The crane inspection system according to claim 1, further comprising:
a display unit that outputs state information indicating a state of the crane based on the captured image data;
an inspection information database in which a work machine ID unique to each of a plurality of the cranes and the state information are associated with each other; and
a customer information database in which a plurality of the work machine IDs and customer information of the plurality of cranes are associated with each other,
wherein the display unit collates a customer of the customer information database with a user of the display unit, and displays the state information of the crane of the plurality of work machine IDs corresponding to the collated customer based on the inspection information database.

11. The crane inspection system according to claim 1,
wherein the drone is capable of flying, and
when the inspection location of the crane is moved due to pivoting of the boom while the drone is in flight, the drone changes the inspection location of the crane based on a pivoting angle of the boom and moves to the changed inspection location of the crane.

* * * * *